United States Patent
Wang

(10) Patent No.: US 10,144,339 B2
(45) Date of Patent: Dec. 4, 2018

(54) VEHICLE LAMP DEVICE AND LIGHT CUT-OFF STRUCTURE THEREOF

(71) Applicant: CHIAN YIH OPTOTECH CO., LTD., Mial-Li Hsien (TW)

(72) Inventor: Cheng Wang, Taipei (TW)

(73) Assignee: CHIAN YIH OPTOTECH CO., LTD., Mial-Li, Hsien (TW)

( * ) Notice: Subject to any disclaimer, the term of this patent is extended or adjusted under 35 U.S.C. 154(b) by 0 days.

(21) Appl. No.: 15/933,878

(22) Filed: Mar. 23, 2018

(65) Prior Publication Data

US 2018/0272925 A1   Sep. 27, 2018

(30) Foreign Application Priority Data

Mar. 24, 2017 (TW) .............................. 106109955 A

(51) Int. Cl.
| | | |
|---|---|---|
| B60Q 1/14 | (2006.01) | |
| B60Q 1/04 | (2006.01) | |
| B60Q 1/10 | (2006.01) | |
| F21S 41/33 | (2018.01) | |
| B60Q 1/076 | (2006.01) | |

(52) U.S. Cl.
CPC ........... *B60Q 1/076* (2013.01); *B60Q 1/0433* (2013.01); *B60Q 1/10* (2013.01); *B60Q 1/1423* (2013.01); *F21S 41/33* (2018.01); *B60Q 2200/30* (2013.01); *B60Q 2300/05* (2013.01)

(58) Field of Classification Search
CPC .... B60Q 1/076; B60Q 1/0433; B60Q 1/1423; B60Q 1/10; B60Q 2200/30; B60Q 2300/05; F21S 41/33
See application file for complete search history.

(56) References Cited

U.S. PATENT DOCUMENTS

| | | | | |
|---|---|---|---|---|
| 6,352,359 | B1 * | 3/2002 | Shie ...................... | F21V 5/002 362/522 |
| 8,764,258 | B2 * | 7/2014 | Watanabe ............... | F21S 48/22 362/516 |
| 2007/0263400 | A1 * | 11/2007 | Walser .................. | B60R 1/1207 362/494 |

* cited by examiner

*Primary Examiner* — Tracie Y Green
(74) *Attorney, Agent, or Firm* — Li & Cai Intellectual Property (USA) Office

(57) ABSTRACT

A vehicle lamp device and a light cut-off structure thereof are disclosed. The light cut-off structure includes a front cut-off edge, a rear cut-off edge, and a top surface. The front cut-off edge corresponds in position to the rear cut-off edge and the top surface is connected between the front and rear cut-off edges. A portion of the top surface is inclined along an inclination direction from the front cut-off edge toward the rear cut-off edge. The portion has a predetermined inclination angle relative to a horizontal plane or a lens optical axis. The predetermined inclination angle is greater than 0 degrees and less than 30 degrees. A lighting pattern with a cut-off line is formed when at least one emitted light is selectively shielded by the front cut-off edge. Therefore, the light concentration ratio can be significantly raised.

21 Claims, 27 Drawing Sheets

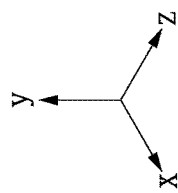
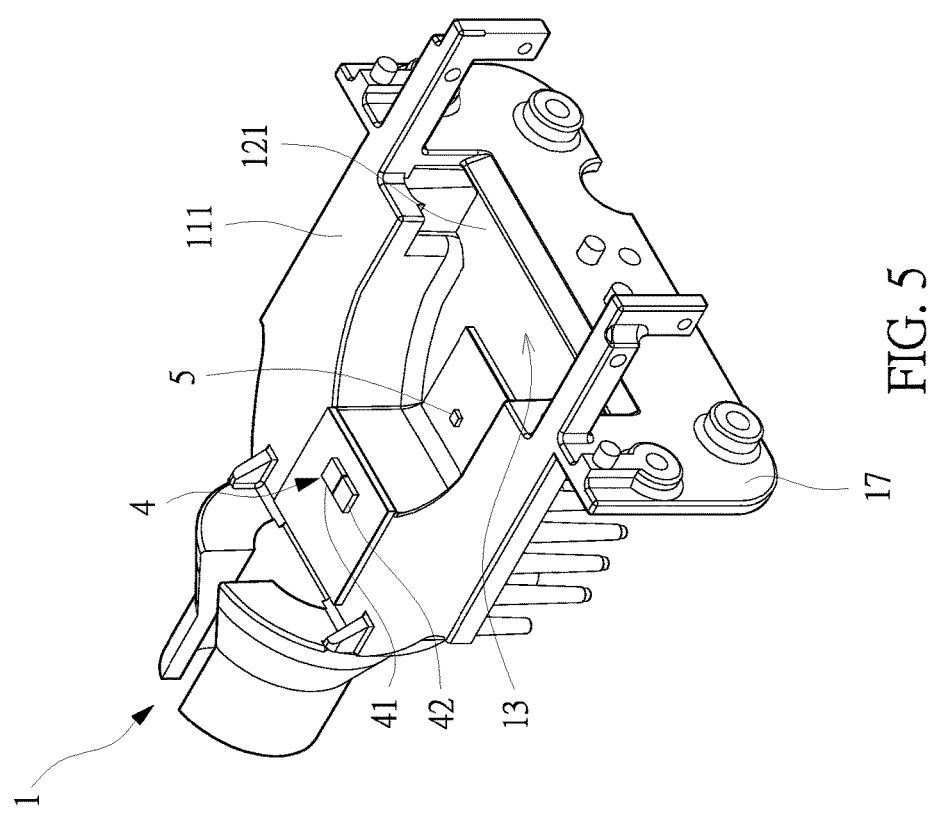
FIG. 5

VEHICLE LAMP DEVICE AND LIGHT CUT-OFF STRUCTURE THEREOF

BACKGROUND OF THE INVENTION

1. Field of the Invention

The instant disclosure relates to a vehicle lamp device, and more particularly to a vehicle lamp device having switchable high-beam and low-beam states and a light cut-off structure thereof

2. Description of Related Art

In the design of the conventional vehicle lamp device, demands and regulations for the high-beam light are different from the low-beam light. For example, the high-beam light is demanded for condensing light, such that a long distance illumination can be provided. The low-beam light is demanded for diffusing light, such that a wide view angle can be provided. Therefore, the design concept for the conventional vehicle lamp devices is often to separate the high-beam and low-beam lights. That is to say, the high-beam and low-beam lights respectively include a specific lamp that contributes to the illumination of high-beam or low-beam. The "vehicle lamp structure for illumination" disclosed in Taiwan Patent No. M353845 achieves the function of switching between high beam and low beam by a low-beam module and a high-beam module separated from the low-beam module.

The lighting module of the conventional vehicle lamp device may employ a halogen tungsten lamp and a high intensity discharge lamp (HID lamp). The tungsten halogen lamp has an arc length of 5.6 mm and the HID lamp has an arc length of 4.3 mm. A projector ellipsoid system (PES) is mostly used to match with the lamp source. The HID lamp produces light by means of an electric arc between two electrodes. Accordingly, the light close to the high light intensity region generated by the electric arc can be distributed to enhance the light condensation of the high-beam light. The light away from the high light intensity region generated by the electric arc can be distributed to enhance the light diffusion of the low-beam light. However, a uniform surface light source using light-emitting diodes (LEDs) does not have any high light intensity region. Therefore, it is difficult to design the vehicle lamp device having switchable high-beam and low-beam modes by only one lens. If the vehicle lamp device has the function of switching between high-beam and low-beam in the presence of only one lens, the volume thereof would be increased and the light intensity thereof would only reach the threshold value in compliance with the regulations.

In order to simulate the length and size of the electric arc of the halogen tungsten lamp and the HID lamp, the continuous-chip type LED package in which LED chips are disposed continuously is included in the lighting module. Only one lighting module can be used in the presence of only one optical and only one focal point, so that the LED die (LED chip) having a size of 1 mm×1 mm is used as the unit to be packaged. In the continuous chip type LED package, a plurality of LED dies are bonded to a silicon substrate by eutectic die bonding or other processes, so that the LED dies are spaced from each other at a distance of 0.2 mm, possibly even 0.05 mm. The LED dies can be deemed as a continuous type lighting object due to the small distance therebetween. However, to attain the same brightness condition, the continuous-chip type LED package has a purchase price ten times higher than that of the general LED package. The general LED package can be obtained by directly packaging only one LED dies or directly packaging two, three or more LED dies. That is to say, the general LED package is non-continuous chip type. More specifically, in the non-continuous chip type LED package, the LED chips are spaced from each other at a distance of greater 0.2 or 0.5 mm, possibly even 4 mm.

Often, the lighting structure arranged above the lens optical axis is turned on only when the conventional vehicle lamp device is in the low-beam state. The lighting structure arranged below the lens optical axis is turned on only if the conventional vehicle lamp device is in the high-beam state (the light cut-off plate rotates toward a downward direction). However, the light cannot be efficiently utilized for illumination under such an operation.

Therefore, there is an urgent need to provide a vehicle lamp device that uses the LED light source(s) optically coupled with the light cut-off structure in the presence of only one lens to achieve the function of switching between high-beam and low-beam, so as to solve the above-mentioned problems.

SUMMARY OF THE INVENTION

In order to solve the above technical problems, the instant disclosure provides a vehicle lamp device for improving the light condensing effect of the vehicle headlamp and reducing the overall volume of the vehicle headlamp.

One of the embodiments of the instant disclosure provides a light cut-off structure which includes a front cut-off edge, a rear cut-off edge, and a top surface. The rear cut-off edge corresponds in position to the rear cut-off edge. The top surface is connected between the front cut-off edge and the rear cut-off edge, wherein a portion of the top surface is inclined along an inclination direction from the front cut-off edge toward the rear cut-off edge. The portion of the top surface has a predetermined inclination angle relative to a horizontal plane or a lens optical axis, and the predetermined inclination angle is greater than 0 degrees and less than 30 degrees. When at least one emitted light is selectively shielded by the front cut-off edge, a lighting pattern with a cut-off line is formed.

Another one of the embodiments of the instant disclosure provides a vehicle lamp device which includes a supporting mount, a first reflecting structure, a second reflecting structure, a first light-emitting structure, a second light-emitting structure, a lens structure and a light cut-off structure. The first reflecting structure is disposed on the supporting mount and has at least one first focal point and at least one second focal point corresponding in position to the at least one first focal point. The second reflecting structure is disposed on the supporting mount and has a first focal point and a second focal point corresponding in position to the first focal point, wherein the second focal point of the second reflecting structure coincides with or is in the vicinity of the second focal point of the first reflecting structure. The first light-emitting structure is disposed on the supporting mount and in exact positional correspondence with the at least one first focal point of the first reflecting structure. The second light-emitting structure is disposed on the supporting mount and in exact positional correspondence with the first focal point of the second reflecting structure. The lens structure has a lens optical axis and a lens focal point on the lens optical axis, wherein the at least one second focal point of the first reflecting structure and the second focal point of the second reflecting structure are positioned on or near the lens optical axis. The light cut-off structure is disposed on the supporting mount and includes a front cut-off edge, a rear cut-off edge corresponding in position to the rear cut-off edge, and a top surface connected between the front cut-off edge and the rear cut-off edge. The top surface is inclined along an inclination direction from the front cut-off edge toward the rear cut-off edge. The top surface has a predetermined inclination angle relative to a horizontal plane or a lens optical axis, and the predetermined inclination angle is greater than 0 degrees and less than 30 degrees. When at least one emitted light is selectively shielded by the front cut-off edge, a lighting pattern with a cut-off line is formed.

Yet another one of the embodiments of the instant disclosure provides a light cut-off structure which includes a front cut-off edge, a rear cut-off edge, a top surface, and a recess structure. The rear cut-off edge corresponds in position to the rear cut-off edge, wherein an inclination direction is defined from the front cut-off edge toward the rear cut-off edge. The top surface is connected between the front cut-off edge and the rear cut-off edge. The recess structure is recessed in the top surface and disposed between the front cut-off edge and the rear cut-off edge. The recess structure has a transitional reflecting surface that is inclined along an inclination direction. At least one emitted light sequentially passes through the rear cut-off edge, the transitional reflecting surface, and the front cut-off edge, and a lighting pattern with a cut-off line is formed when the at least one emitted light is selectively shielded by the front cut-off edge.

Another one of the embodiments of the instant disclosure provides a vehicle lamp device which includes a supporting mount, a main reflecting structure, a main light-emitting structure, a lens structure, and a light cut-off structure. The main reflecting structure is disposed on the supporting mount and has a first focal point and a second focal point corresponding in position to the first focal point. The main light-emitting structure is disposed on the supporting mount and in exact positional correspondence with the first focal point of the main reflecting structure. The lens structure has a lens optical axis and a lens focal point on the lens optical axis, wherein the second focal point of the main reflecting structure is positioned on or near the lens optical axis. The light cut-off structure is disposed on the supporting mount and includes a front cut-off edge, a rear cut-off edge corresponding in position to the rear cut-off edge, and a top surface connected between the front cut-off edge and the rear cut-off edge. The top surface is inclined along an inclination direction from the front cut-off edge toward the rear cut-off edge. The top surface has a predetermined inclination angle relative to a horizontal plane or a lens optical axis, and the predetermined inclination angle is greater than 0 degrees and less than 30 degrees. When at least one emitted light is selectively shielded by the front cut-off edge, a lighting pattern with a cut-off line is formed.

One benefit of the instant disclosure is that: the vehicle lamp device and the light cut-off structure thereof according to the embodiments of the instant disclosure can utilize the technical feature about "the top surface in which a portion thereof is inclined along the inclination" to enhance the light condensing effect.

To further understand the techniques, means and effects of the instant disclosure, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

FIG. 5 is a schematic view showing a practical example of the supporting mount of the vehicle lamp device according to the first embodiment of the instant disclosure;

DETAILED DESCRIPTION OF THE PREFERRED EMBODIMENTS

Embodiments of a vehicle lamp device and a light cut-off structure thereof according to the instant disclosure are described herein. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Notably, the terms first, second, third, etc., may be used herein to describe various elements or signals, but these elements or signals should not be affected by such elements or terms. Such terminology is used to distinguish one element from another or a signal with another signal. Further, the term "or" as used herein in the case may include any one or combinations of the associated listed items.

First Embodiment

Figure 10:
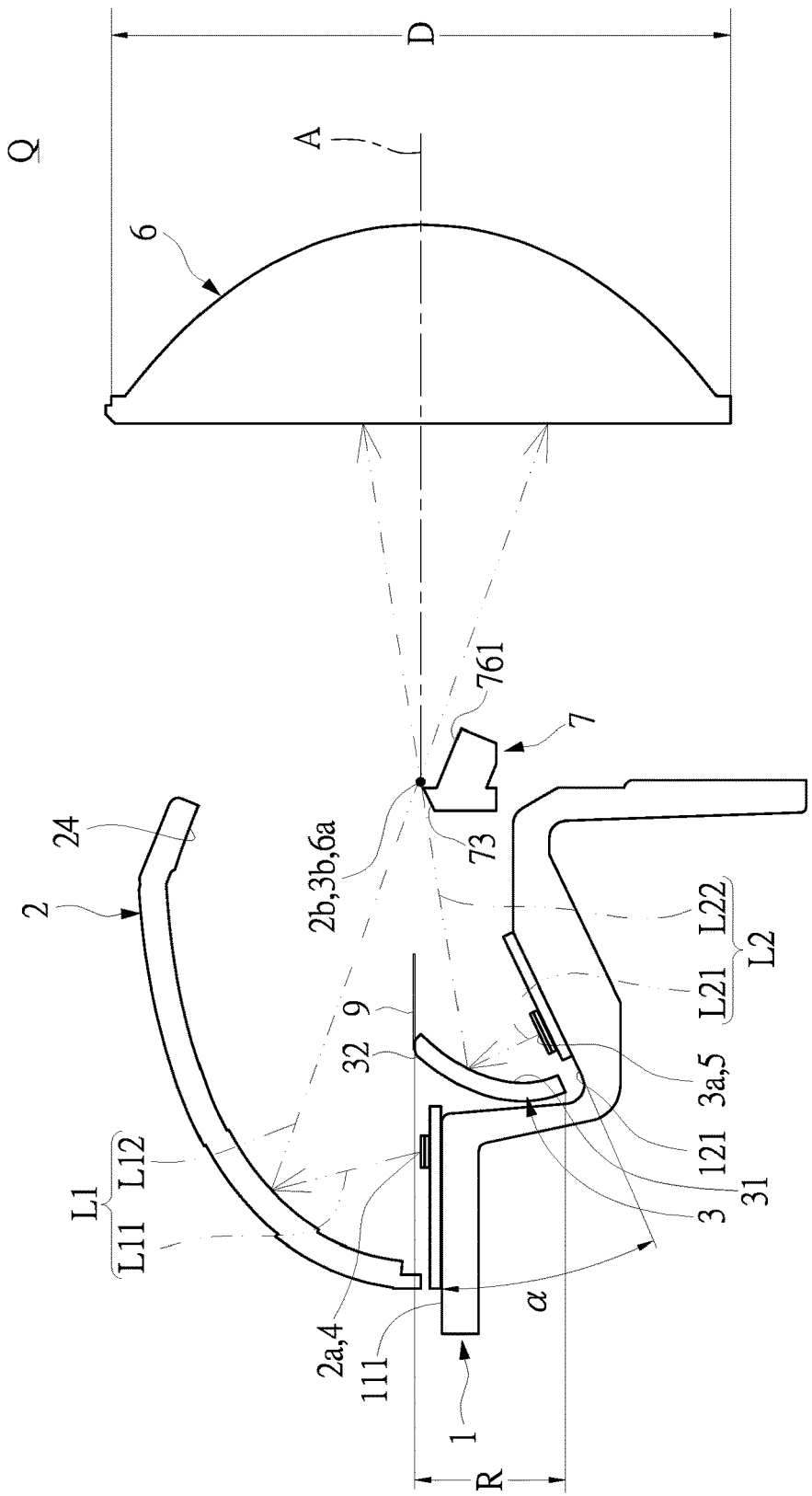
FIG. 10 is a side cross-sectional schematic view taken along the cut-line X-X of FIG. 1, and showing the low-beam state.

Please refer to FIGS. 1 to 4 and 10. FIGS. 1 and 2 and FIGS. 3 and 4 are, respectively, three-dimensional assembled and three-dimensional exploded schematic views of the vehicle lamp device Q. FIG. 10 is a schematic view showing the architecture of the vehicle lamp device Q in the low-beam state. The vehicle lamp device Q includes a supporting mount 1, a first reflecting structure 2, a second reflecting structure 3 (also called "main reflecting structure"), a first light-emitting structure 4, a second light-emitting structure 5 (also called "main light-emitting structure"), a lens structure 6 and a light cut-off structure 7. In this embodiment, the first reflecting structure 2 and the second reflecting structure 3 can be formed with a plurality of curved surfaces with different curvatures or only one curved surface. For example, the curved surface(s) is/are ellipse-based curved surface(s). The first reflecting structure 2 and the second reflecting structure 3 are disposed on the supporting mount 1. In this embodiment, the first reflecting structure 2 and the second reflecting structure 3 can be fixed to the supporting mount 1 by at least one fixing member S, such as a fixing screw, but the instant disclosure is not limited thereto.

Please refer to FIGS. 1 to 4. The first reflecting structure 2 and the second reflecting structure 3 each can have a reflecting surface respectively facing the first light-emitting structure 4 and the second light-emitting structure 5, so as to reflect emitted lights generated from the first light-emitting structure 4 and the second light-emitting structure 5. The light cut-off structure 7 can reciprocatingly swing between a first position (i.e., low-beam position) and a second position (i.e., high-beam position), so as to switch between the low-beam state and the high-beam state. In this embodiment, the low-beam lighting pattern is produced when the first light-emitting structure 4 is turned on. The high-beam lighting pattern is produced when the first light-emitting structure 4 and the second light-emitting structure 5 are turned on with the rotation of the light cut-off structure 7. However, there is no limitation to the operation of the low-beam and high-beam states. For example, except for respectively turning on the first light-emitting structure 4 and the second light-emitting structure 5 with the rotation of the light cut-off structure 7 to produce the low-beam lighting pattern or the high-beam lighting pattern, in other embodiments, no matter in the low-beam state or the high-beam state, the first light-emitting structure 4 and the second light-emitting structure 5 can be concurrently turned on with the rotation of the light cut-off structure 7 to respectively provide the low-beam lighting pattern or the high-beam lighting pattern. More specifically, when the first light-emitting structure 4 and the second light-emitting structure 5 are concurrently turned on, the emitted light from the second light-emitting structure 5 can be reflected by the second reflecting structure 3 for the contribution of the hot spot region (i.e., points 75R, 50V and 50R of regulation) of the low-beam lighting pattern. The first light-emitting structure 4 and the second light-emitting structure 5 each can be a light-emitting diode (LED) or a package structure including a plurality of LEDs. For the vehicle lamp device Q, the first reflecting structure 2 is configured to diffuse light and the second reflecting structures 3 is configured to condense light, but the instant disclosure is not limited thereto.

Please refer to FIG. 10. The first reflecting structure 2 has at least one first focal point 2a and at least one second focal point 2b corresponding in position to the at least one first focal point 2a. The second reflecting structure 3 has a first focal point 3a and a second focal point 3b corresponding in position to the first focal point 3a. The second focal point 3b of the second reflecting structure 3 coincides with or is in the vicinity of the second focal point 2b of the first reflecting structure 2. Preferably, the second focal point 3b of the second reflecting structure 3 and the second focal point 2b of the first reflecting structure 2 coincide with each other, but are not limited thereto. In other embodiments, the second focal point 3b of the second reflecting structure 3 can be in the vicinity of the second focal point 2b of the first reflecting structure 2.

Please refer to FIGS. 1 to 4. The supporting mount 1 has a first supporting surface 111 and a second supporting surface 121 that is not coplanar to the first supporting surface 111. The first light-emitting structure 4 is disposed on the first supporting surface 111 to emit a first light L1. The second light-emitting structure 5 is disposed on the second supporting surface 121 to emit a second light L2. In practice, the first light-emitting structure 4 and the second light-emitting structure 5 are respectively disposed on a circuit board (not numbered), and thus are respectively disposed on the supporting mount 1 with the circuit board.

Figure 7:
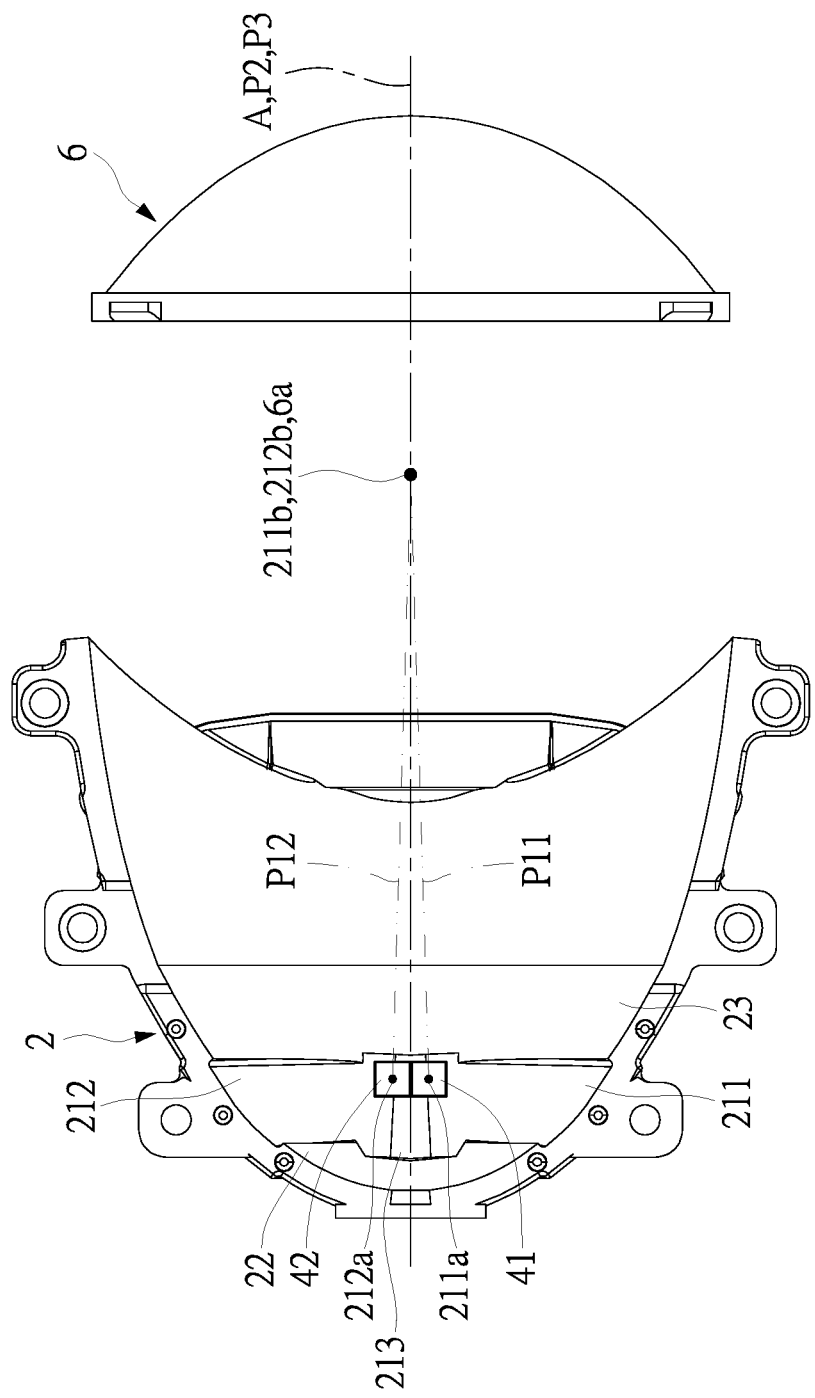
FIG. 7 is a top view showing the first reflecting structure and the lens structure of the vehicle lamp device according to the first embodiment of the instant disclosure.

Please refer to FIG. 10. The first light-emitting structure 4 is disposed in exact positional correspondence with the at least one first focal point 2a of the first reflecting structure 2. The second light-emitting structure 5 is disposed in exact positional correspondence with the first focal point 3a of the second reflecting structure 3. Note that, under the situation that the first reflecting structure 2 has only one first focal point 2a, the first light-emitting structure 4 is disposed on the first focal point 2a, but is not limited thereto. In other embodiments, the first reflecting structure 2 can have two first focal points 2a (i.e., first focal points 211a and 212a as shown in FIG. 7) apart from each other and two second focal points 2b (i.e., second focal points 211b and 212b as shown in FIG. 7) respectively corresponding in position to the first focal points 2a. In other embodiments, the second reflecting structure 3 can have two first focal points 3a (not shown) apart from each other and two second focal points 3b (not shown) respectively corresponding in position to the first focal points 3a. Note that, under the situation that the first reflecting structure 2 and the second reflecting structure 3 each have at least two first focal points 2a, 3a and at least two second focal points 2b, 3b, each of them is a reflecting structure having two or more optical axes. The practical embodiment in which the first reflecting structure 2 has at least two first focal points 2a (i.e., first focal points 211a and 212a as shown in FIG. 7) will be further described hereinafter.

Figure 11:
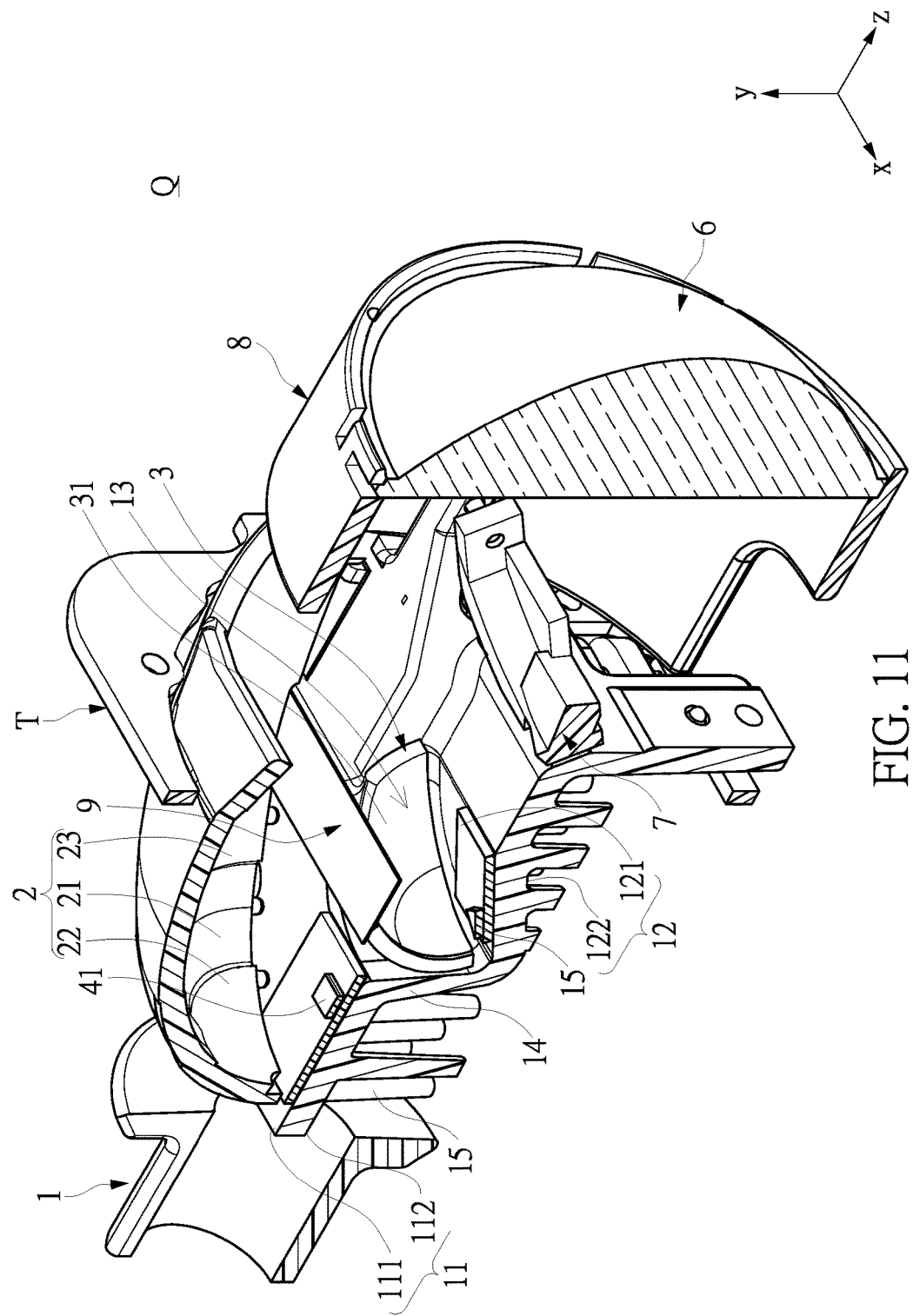
FIG. 11 is a three-dimensional cross-sectional schematic view taken along the cut-line X-X of FIG. 1, and showing the high-beam state.

Please refer to FIGS. 1 to 4, 10 and 11. Note that, under the situation that the first light-emitting structure 4 and the second light-emitting structure 5 are concurrently turned on, the second light-emitting structure 5 optically coupled with the second reflecting structure 3 not only can, in the low-beam state, contribute to the hot spot region of the low-beam lighting pattern, but also can, in the high-beam state, contribute to the enhancement of the brightness of the high-beam lighting pattern based on the first light-emitting structure 4 optically coupled with the first reflecting structure 2. In this embodiment, the size of the second reflecting structure 3 is smaller than that of the first reflecting structure 2. That is to say, as shown in FIG. 10, the first reflecting structure 2 has a projection area larger than that of the second reflecting structure 3. The projection area of the second reflecting structure 3 can be entirely overlapped within the projection area of the first reflecting structure 2. That is to say, when downwardly viewing along the y-direction (i.e., a downward direction from the first reflecting structure 2 toward the second reflecting structure 3), the second reflecting structure 3 is entirely covered by the first reflecting structure 2. More specifically, as shown in FIG. 11, the surface area of the total reflecting surface (i.e., first, second, and third reflecting surfaces 21, 22, 23) of the first reflecting structure 2 is larger than the surface area of the total reflecting surface (i.e., reflecting surface 31) of the second reflecting structure 3. The surface area of the total reflecting surface of the first reflecting structure 2 is at least two times larger than that of the second reflecting structure 3. Therefore, the overall volume of the vehicle lamp device Q can be significantly reduced, and the configuration of the supporting mount 1 can be modified so as to enhance the heat-dissipating effect of the vehicle lamp device Q.

Please refer to FIG. 10. The lens structure 6 has a lens optical axis A and a lens focal point 6a on the lens optical axis A. The at least one second focal point 2b of the first reflecting structure 2 and the second focal point 3b of the second reflecting structure 3 can be positioned on the lens optical axis A or near the lens optical axis A. The instant disclosure takes the practical embodiment in which the at least one second focal point 2b of the first reflecting structure 2 and the second focal point 3b of the second reflecting structure 3 are positioned on the lens optical axis A and coincide with the lens focal point 6a for description, but is not limited thereto. Note that, in this embodiment, the size of the second reflecting structure 3 is smaller than that of the first reflecting structure 2, such that the first focal point 3a of the second reflecting structure 3, as shown in FIG. 10, can be positioned between the lens focal point 6a and the at least one first focal point 2a of the first reflecting structure 2 or right below the at least one first focal point 2a of the first reflecting structure 2. Furthermore, note that the lens structure 6 has a lens diameter D and the second reflecting structure 3 has a predetermined height R between a top end portion 32 and a bottom end portion thereof, wherein the predetermined height R ranges between D/7 and D/2. Preferably, the top end portion 32 of the second reflecting structure 3 is positioned above the lens optical axis A. For example, the shortest distance between the top end portion 32 of the second reflecting structure 3 and the lens optical axis A is less than 5 mm, preferably between 1 mm and 3 mm.

Figure 1:
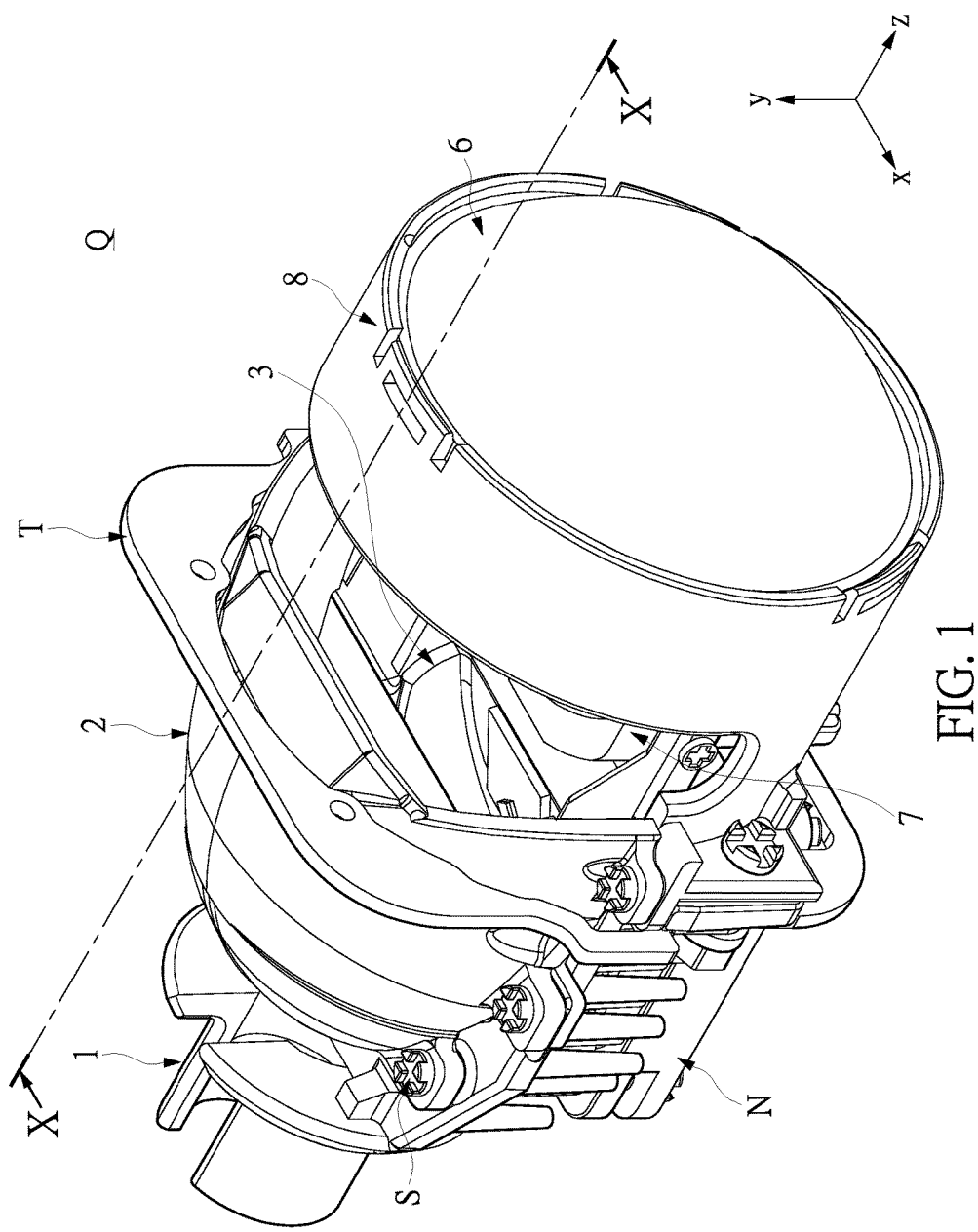
FIG. 1 is a three-dimensional assembled schematic view of the vehicle lamp device according to the first embodiment of the instant disclosure.
Figure 2:
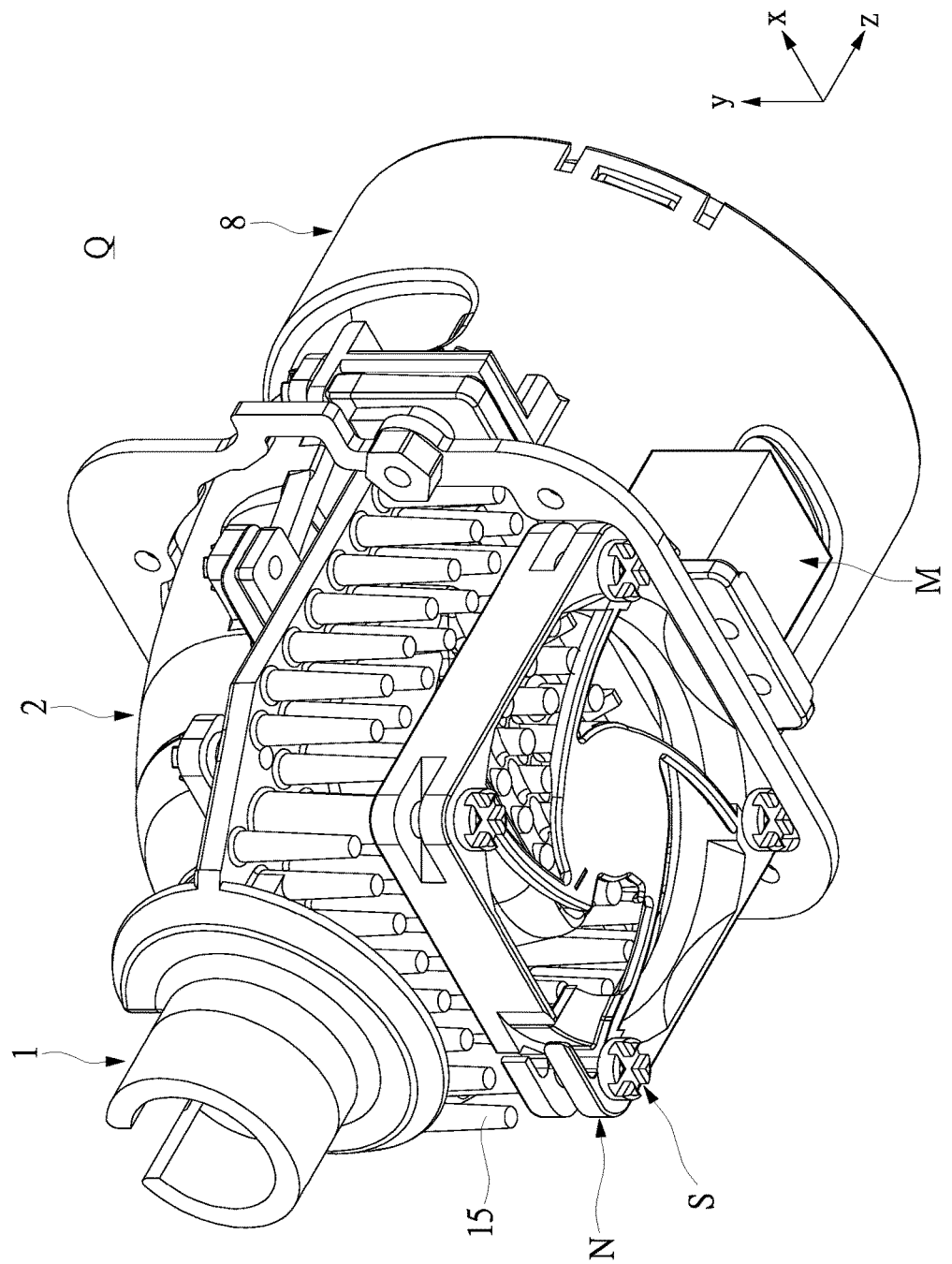
FIG. 2 is another three-dimensional assembled schematic view of the vehicle lamp device according to the first embodiment of the instant disclosure.
Figure 3:
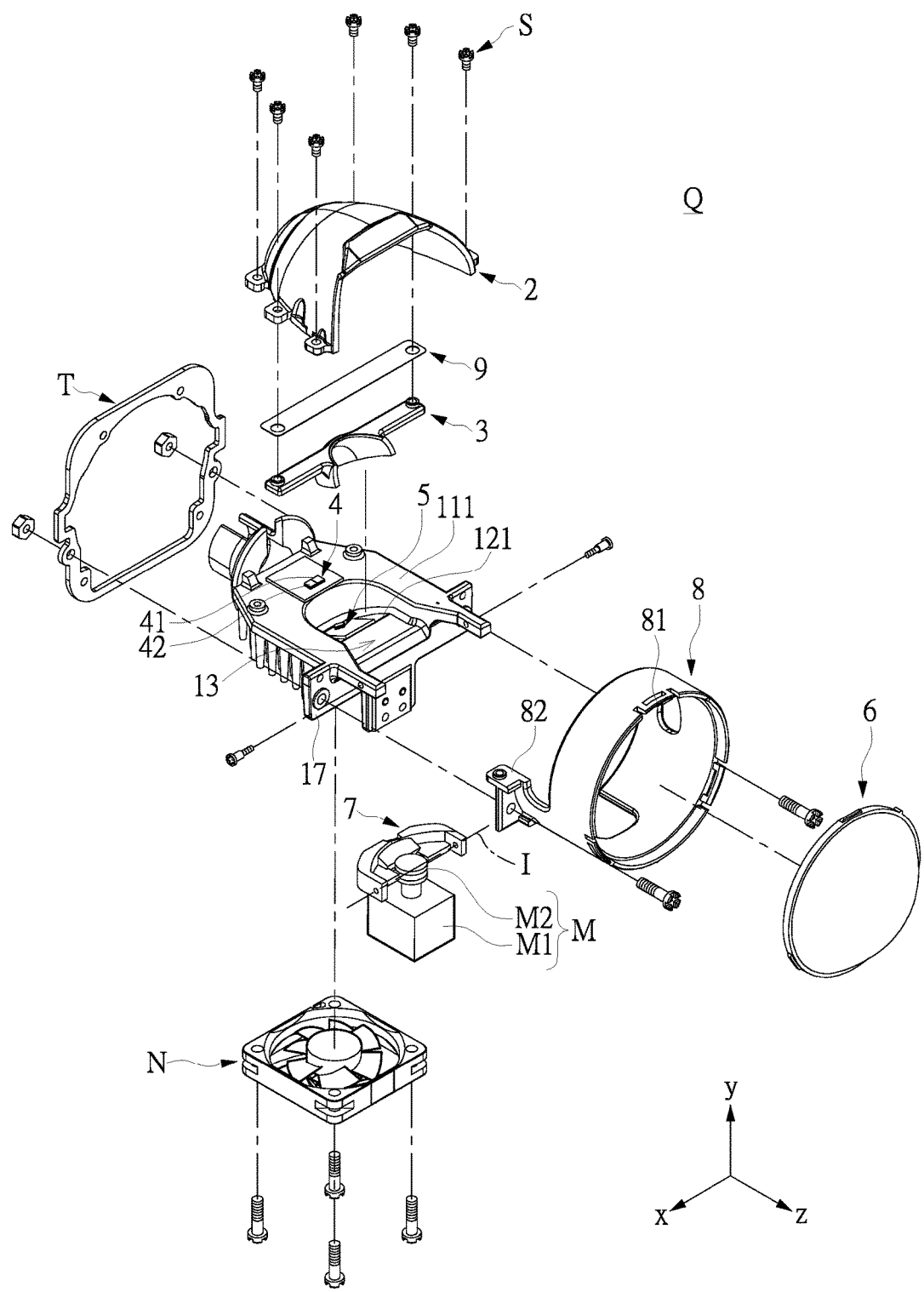
FIG. 3 is a three-dimensional exploded schematic view of the vehicle lamp device according to the first embodiment of the instant disclosure.
Figure 4:
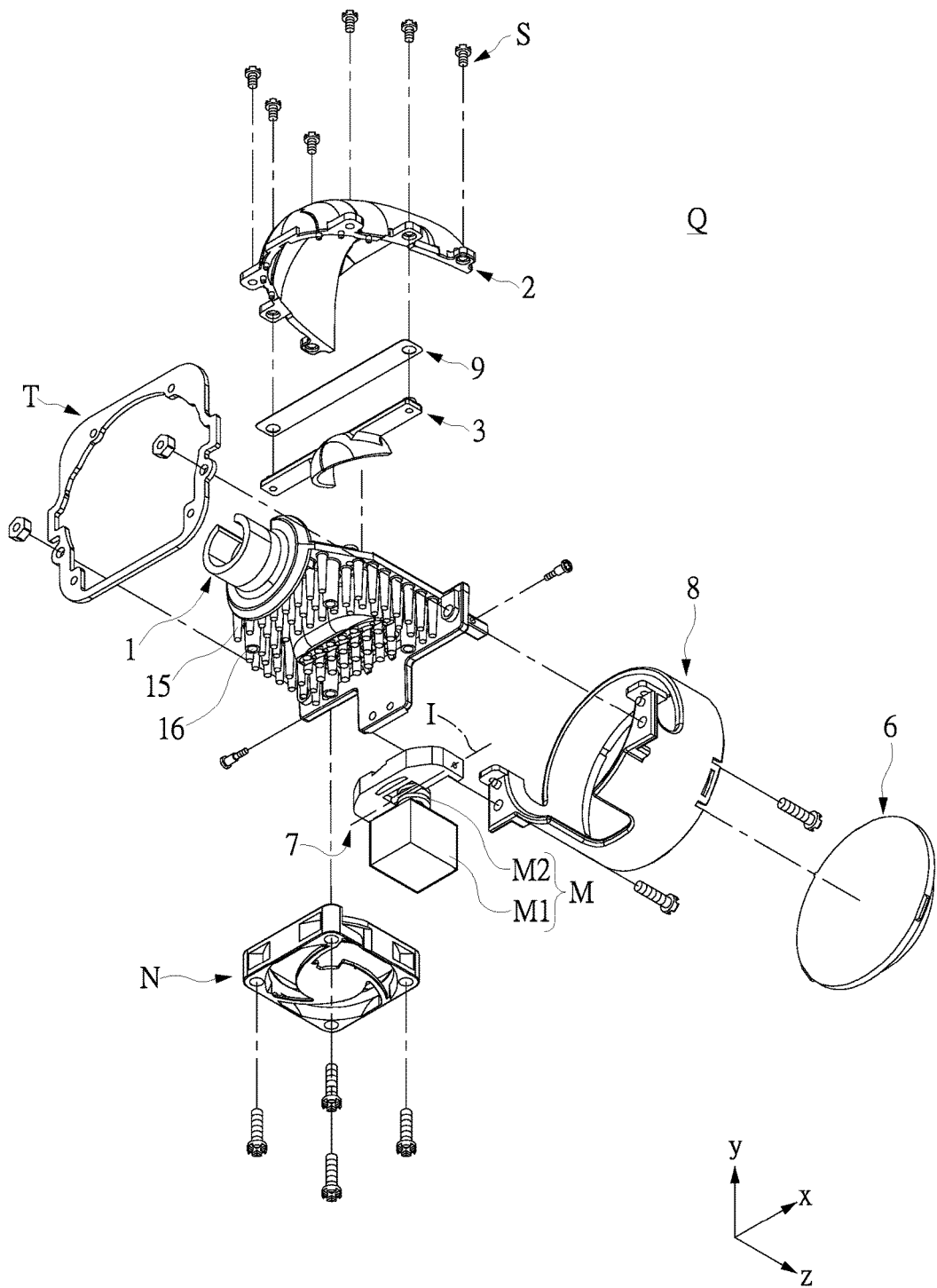
FIG. 4 is another three-dimensional exploded schematic view of the vehicle lamp device according to the first embodiment of the instant disclosure.

Please refer to FIGS. 3 and 4 along with FIG. 5. FIG. 5 shows another practical embodiment of the supporting mount 1. More specifically, the supporting mount 1 further includes an accommodating slot 13 recessed in the first supporting surface 111. The second reflecting structure 3 and the second light-emitting structure 5 are disposed in the accommodating slot 13, wherein the second supporting surface 121 is a bottom surface of the accommodating slot 13. In the practical embodiment as shown in FIGS. 3 and 4, the first supporting surface 111 is parallel to the lens optical axis A. The second supporting surface 121 is inclined relative to the first supporting surface 111 at a predetermined angle α of between 7 and 90 degrees, preferably between 12.5 and 35 degrees. In the practical embodiment as shown in FIG. 5, the first supporting surface 111 is substantially parallel to the second supporting surface 121. Note that, under the situation that the first supporting surface 111 is parallel to the second supporting surface 121, the first supporting surface 111 and the second supporting surface 121 substantially face a predetermined direction y above a corresponding horizontal plane, but are not limited to the direction perpendicular to the corresponding horizontal plane. For example, in the practical embodiment as shown in FIGS. 3 and 4, the second supporting surface 121 is inclined and faces upwardly. The predetermined direction y that the first supporting surface 111 and the second supporting surface 121 face is a direction above a corresponding horizontal plane. Therefore, as shown in FIG. 10, a portion of a first projection light L11 generated from the first light-emitting structure 4 and a portion of a second projection light L21 generated from the second light-emitting structure 5 can respectively project to the first reflecting structure 2 and the second reflecting structure 3 toward an upward direction above the corresponding horizontal plane.

Figure 8:
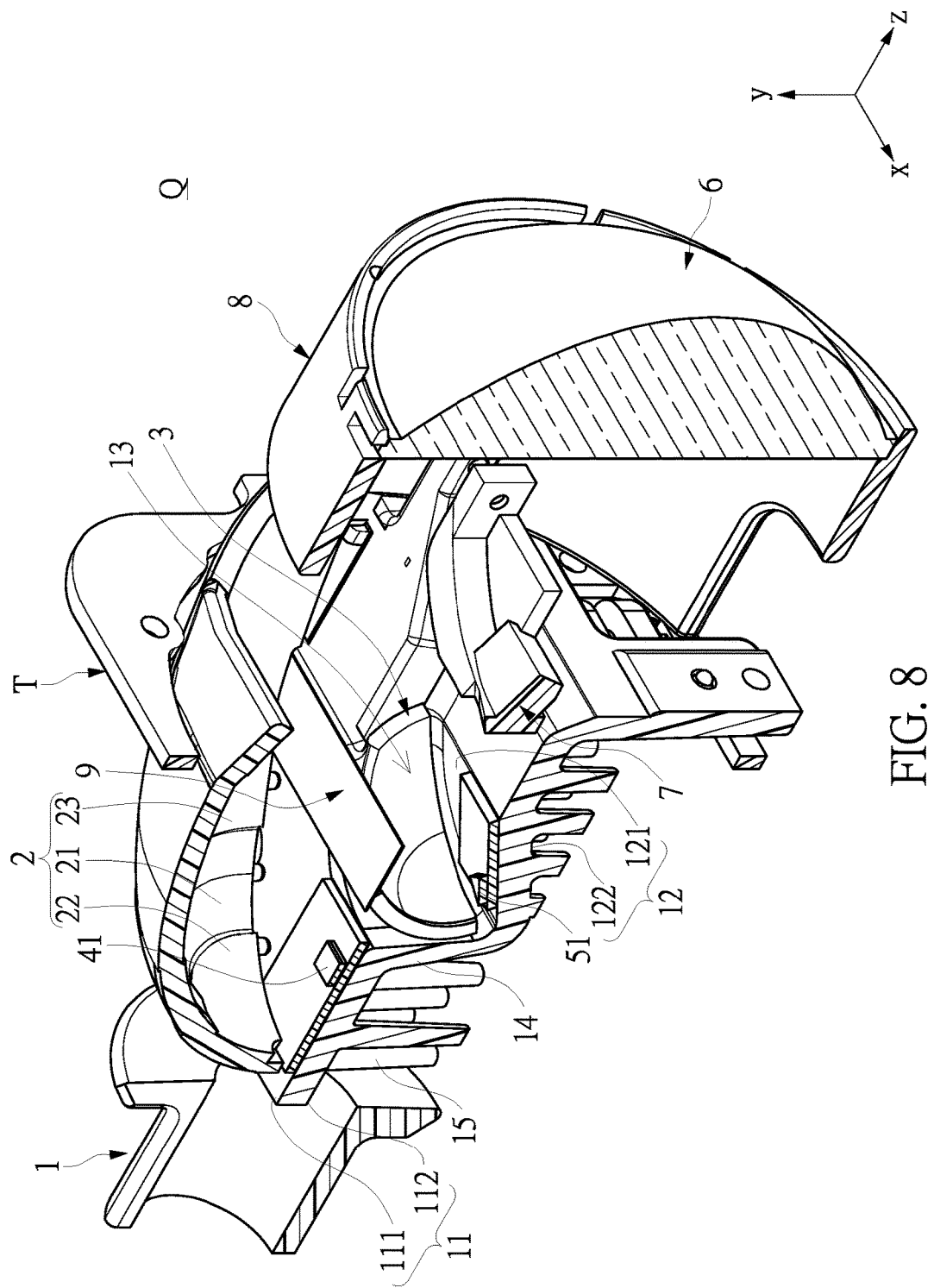
FIG. 8 is a three-dimensional cross-sectional schematic view taken along the cut-line X-X of FIG. 1, and showing the low-beam state.

Please refer to FIGS. 3, 4, and 8. FIG. 8 is a three-dimensional cross-sectional schematic view of the vehicle lamp device Q. The supporting mount 1 can include a first supporting plate 11 and a second supporting plate 12 extending from the first supporting plate 11. The first supporting surface 111 can be disposed on the first supporting plate 11 and the second supporting surface 121 can be disposed on the second supporting plate 12. The second supporting plate 12 (or second supporting surface 121) can be inclined relative to the first supporting plate 11 (or first supporting surface 111). The accommodating slot 13 can be formed between the first supporting plate 11 and the second supporting plate 12, and be surrounded by a connecting plate 14 connected between the first supporting plate 11 and the second supporting plate 12. Note that, the material cost can be reduced by the extension of the second supporting plate 12 from the first supporting plate 11. Furthermore, the configuration of the first supporting plate 11, the connecting plate 14, and the second supporting plate 12 is in a step shape, and the first light-emitting structure 4 and the second light-emitting structure 5 are respectively disposed on the first supporting plate 11 and the second supporting plate 12. Therefore, the first light-emitting structure 4 can be interlaced with the second light-emitting structure 5 to separate heat sources, and to increase the heat-dissipating area so as to enhance the heat-dissipating effect.

Please refer to FIGS. 3, 4, and 8. The vehicle lamp device Q can further include a light shielding structure 9 disposed above the second reflecting structure 3 to prevent the light of the second light-emitting structure 5 from projecting to the first reflecting structure 2 so as to block the stray light.

Please refer to FIGS. 3, 4, and 8. The supporting mount 1 further includes a plurality of heat-dissipating structures 15. The heat-dissipating structures 15 such as heat-dissipating fins can be disposed on a first heat-dissipating surface 112 opposite to the first supporting surface 111 or a second heat-dissipating surface 122 opposite to the second supporting surface 121. The heat-dissipating structures 15 can extend along a direction away from the first supporting surface 111 and a direction away from the second heat-dissipating surface 122 (directions below the corresponding horizontal surface). Note that, the second supporting plate 12 is connected to the first supporting plate 11 by the connecting plate 14, such that the extension length of the heat-dissipating structures 15 disposed on the first heat-dissipating surface 112 can be longer than that of the heat-dissipating structures 15 disposed on the second heat-dissipating surface 122 to significantly enhance the heat-dissipating effect. Under this situation, the connecting plate 14 is surrounded by the heat-dissipating structures 15 disposed on the first heat-dissipating surface 112.

Please refer to FIGS. 1 to 4. The vehicle lamp device Q further includes a fan structure N which can be disposed on the supporting mount 1. More specifically, the supporting mount 1 further includes a fixing portion 16 for fixing the fan structure N. The fixing portion 16 can be disposed on the first heat-dissipating surface 112 or the second heat-dissipating surface 122. Therefore, a better heat dissipating effect can be achieved due to the height and size differences between the first supporting plate 11 and the second supporting plate 12. Note that, to facilitate the expression, the assembled views only show the casing of the fan structure N and do not show fan blades. The configuration of the fan structure N is known to the persons skilled in the art.

Please refer to FIGS. 1 to 4. The vehicle lamp device Q further includes a lens holding structure 8 which can be disposed on the supporting mount 1. The lens structure 6 can be disposed on the lens holding structure 8. More specifically, the supporting mount 1 further includes a retaining portion 17 disposed on the first supporting plate 11 for retaining the lens holding structure 8. The lens holding structure 8 further includes a holding portion 81 for holding the lens structure 6 and a connecting portion 82 for connecting to the retaining portion 17 of the supporting mount 1. In addition, the vehicle lamp device Q further includes a frame T disposed on the supporting mount 1. The vehicle lamp device Q can be disposed on the assembly or the outer casing of the vehicle lamp by the frame T.

Please refer to FIGS. 1 to 4. The light cut-off structure 7 is disposed on the supporting mount 1 and between the first reflecting structure 2 and the second reflecting structure 3 to reciprocatingly swing around a rotation axis I. More specifically, the light cut-off structure 7 can be driven by a driving unit M. In this embodiment, the driving unit M includes an electromagnetic valve M1 and a rod member M2 controlled by the electromagnetic valve M1. The rod member M2 can drive a linking portion (not shown) of the light cut-off structure 7 to rotate the light cut-off structure 7 around the rotation axis I. Note that, there is no limitation to the type of the driving unit M as shown in the figures, other applicable types of the driving unit M are known to the persons skilled in the art. In this embodiment, the light cut-off structure 7 is configured to produce the cut-off line. Accordingly, as shown in FIG. 10, the first light L1 generated from the first light-emitting structure 4 and the second light L2 generated from the second light-emitting structure 5 can be selectively shielded by the light cut-off structure 7 to produce the lighting pattern in compliance with regulations. Note that, only in the presence of the main light-emitting structure 5, at least one light emitted therefrom can produce the lighting pattern in compliance with regulations. The specific example of the regulations includes, but is not limited to, regulations of United Nations Economic Commission for Europe such as ECE R98, ECE R112, or ECE R113, or the Society of Automotive Engineers (SAE) standards. That is to say, any lighting pattern produced with the cut-off line is the lighting pattern in compliance with regulations of the car headlamp. The details about the light cut-off structure 7 will be further described hereinafter.

Figure 6:
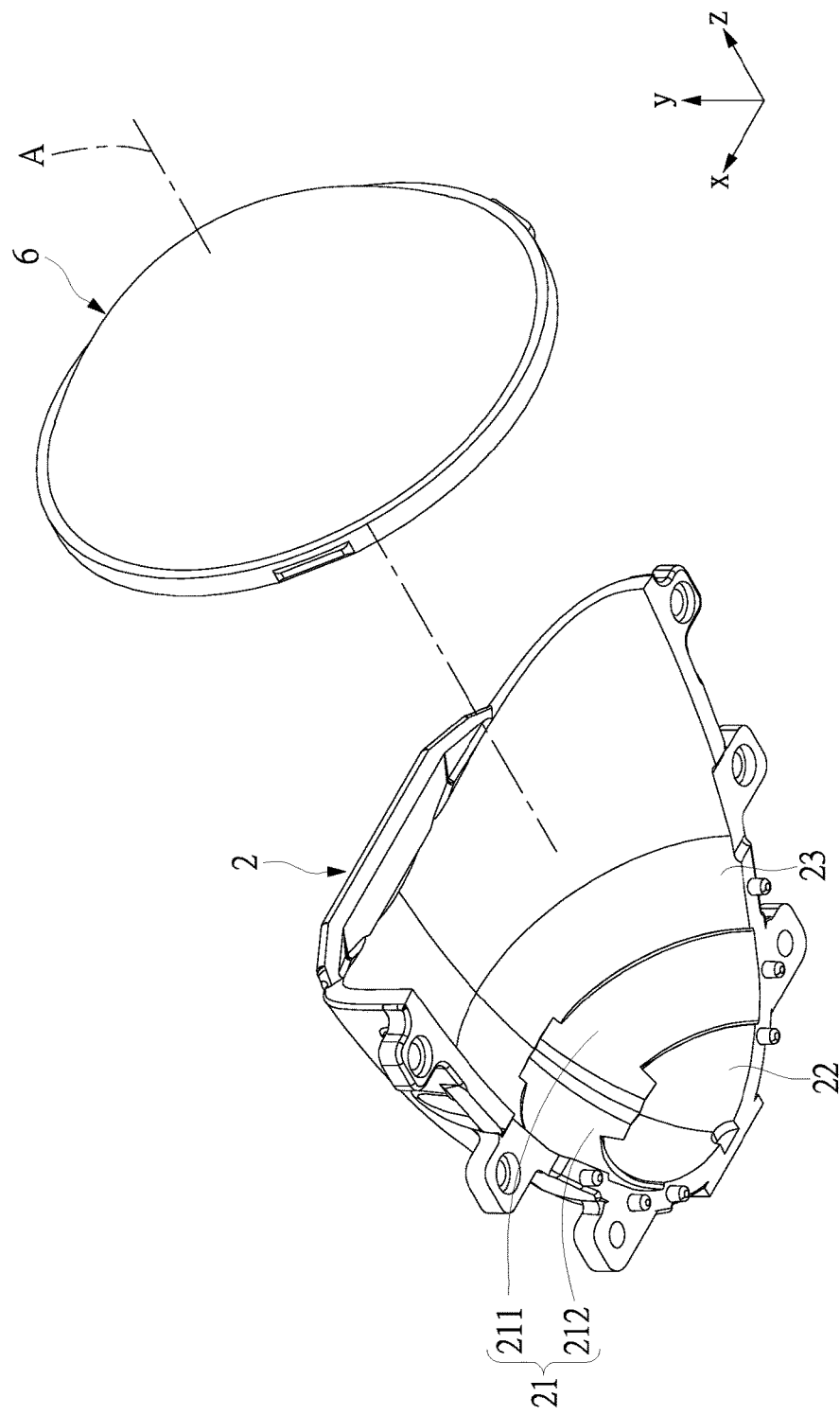
FIG. 6 is a three-dimensional schematic view showing the first reflecting structure and the lens structure of the vehicle lamp device according to the first embodiment of the instant disclosure.

Please refer to FIGS. 6 and 7. FIGS. 6 and 7 are schematic views showing the design of the first reflecting structure 2 and the lens structure 6. The following will describe the practical embodiment in which the first reflecting structure 2 has two first focal points 2a and two second focal points 2b. More specifically, the first reflecting structure 2 can have a first reflecting surface 21 and a second reflecting surface 22 connected to the first reflecting surface 21. The first reflecting surface 21 can have a first optical axis P11 and a second optical axis P12 and the second reflecting surface 22 can have an optical axis P2. The first light-emitting structure 4 includes a first light-emitting element 41 and a second light-emitting element 42. The first light-emitting element 41 and the second light-emitting element 42 each can be a light-emitting diode. The first light-emitting element 41 and the second light-emitting element 42 can have a spacing of from 0.2 mm to 5 mm therebetween. That is to say, the shortest distance between the edges of the first light-emitting element 41 and the second light-emitting element 42 can range between 0.2 mm and 5 mm.

The first reflecting structure 2 can further have a third reflecting surface 23. The third reflecting surface 23 is disposed between the first reflecting surface 21 and the second reflecting surface 22 and has an optical P3. Furthermore, the first reflecting surface 21 can be composed of a first light-condensing arc surface 211 and a second light-condensing arc surface 212. Preferably, the first reflecting surface 21 can further include a light-diffusing arc surface 213 disposed between the first light-condensing arc surface 211 and the second light-condensing arc surface 212.

Please refer to FIG. 7. The first reflecting surface 21 of the first reflecting structure 2 has two first focal points 211a, 212a apart from each other and two second focal points 211b, 212b corresponding in position to the two first focal points 211a, 212a. The first light-emitting element 41 is disposed on one of the two first focal points 211a and the second light-emitting element 42 is disposed on another one of the two first focal points 212a. The two second focal points 211b, 212b of the first reflecting structure 2 coincide with each other, the lens optical axis A passes through the two second focal points 211b, 212b, and the lens focal point 6a coincides with the two second focal points 211b, 212b. Note that, the two first focal points 211a, 212a of the first reflecting surface 21 are respectively provided by the first light-condensing arc surface 211 and the second light-condensing arc surface 212. The two second focal points 211b, 212b of the first reflecting surface 21 are respectively provided by the first light-condensing arc surface 211 and the second light-condensing arc surface 212. The first optical axis P11 of the first reflecting surface 21 passes through the first light-emitting element 41. The second optical axis P12 of the first reflecting surface 21 passes through the second light-emitting element 42. The optical axis P2 of the second reflecting surface 22 and the optical axis P3 of the third reflecting surface 23 are positioned between the first light-emitting element 41 and the second light-emitting element 42. Preferably, the optical axis P2 of the second reflecting surface 22 and the optical axis P3 of the third reflecting surface 23 coincide with the lens optical axis A. The first optical axis P11 of the first reflecting surface 21 is an axis that passes through one of the two first focal points 211a and one of the two second focal points 211b. The second optical axis P12 of the first reflecting surface 21 is an axis that passes through one of the two first focal points 212a and one of the two second focal points 212b.

Figure 9:
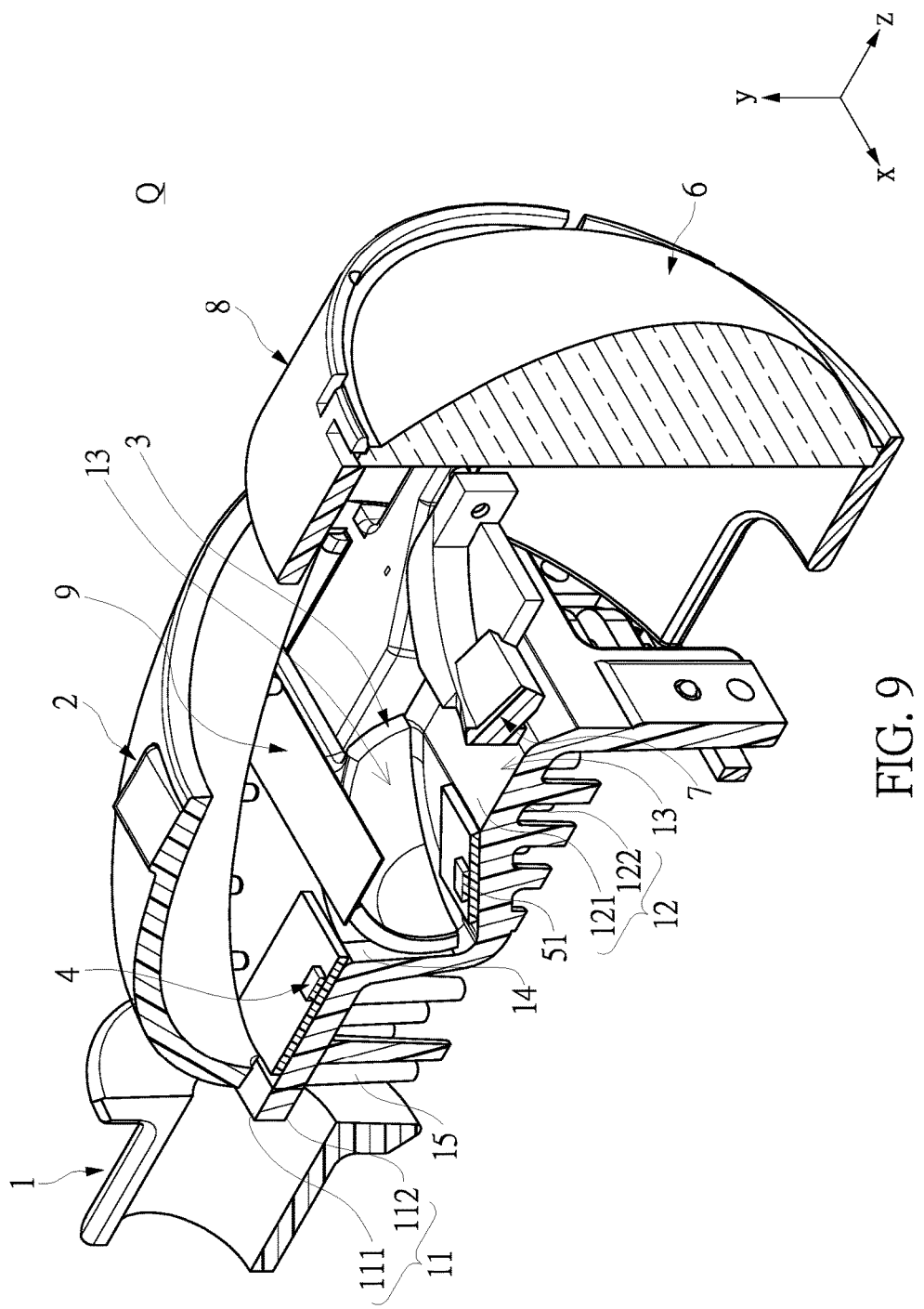
FIG. 9 is a three-dimensional cross-sectional schematic view showing a practical example of the first reflecting structure of the vehicle lamp device according to embodiments of the instant disclosure.

Please refer to FIGS. 8 and 9 together with FIG. 10. The following will further describe the light path of the first light L1 and the second light L2. Note that, the main differences shown in FIGS. 8 and 9 are that the first reflecting structure 2, as shown in FIG. 8, is composed of a plurality of ellipsoidal curved surfaces, and the first light-emitting structure 4 has a first light-emitting element 41 and a second light-emitting element 42 (please refer to FIG. 3). The first reflecting structure 2, as shown in FIG. 9, has only one ellipsoidal curved surface or complex ellipsoidal curved surface, and the first light-emitting structure 4 has only one light-emitting element which is disposed in the first focal point 2a of the first reflecting structure 2. However, there is no limitation to the first reflecting structure 2 composed of only one ellipsoidal curved surface or complex ellipsoidal curved surface.

The following will describe the practical embodiment as shown in FIG. 9. The first reflecting structure 2 has a first focal point 2a and a second focal point 2b corresponding in position to the first focal point 2a. The second reflecting structure 3 has a first focal point 3a and a second focal point 3b corresponding in position to the first focal point 3a. The first light-emitting structure 4 can include a light-emitting element such as an LED chip or an LED package structure including a plurality of LED chips, preferably an LED chip. The second light-emitting structure 5 can include a light-emitting element 51. The light-emitting element of the first light-emitting structure 4 is disposed on the at least one first focal point 2a of the first reflecting structure 2. The light-emitting element 51 of the second light-emitting structure 5 is disposed on the at least one first focal point 3a of the second reflecting structure 3. However, the instant disclosure is not limited to the above-mentioned example. The first reflecting structure 2, as shown in FIGS. 6 and 7, can have a plurality of first focal points 2a and a plurality of second focal points 2b respectively corresponding in position to the first focal points 2a. The second reflecting structure 3 can have a plurality of first focal points 3a and a plurality of second focal points 3b respectively corresponding in position to the first focal points 3a. The first light-emitting structure 4 and the second light-emitting structure 5 can have a plurality of light-emitting elements. Although the edge of the light-emitting element 51, as shown in FIG. 8, can be inclined relative to the edge of the light-emitting element 41 at an inclination angle of 45 degrees, in the practical embodiment as shown in FIG. 9, the light-emitting element 51 can be rotated at an angle to allow its edge to be parallel to the edge of the light-emitting element 41. Note that, as shown in FIG. 8, when a connection line defined by two farthest vertexes of the light-emitting element 51 is parallel to the lens optical axis A, a lighting pattern having a higher brightness or a wider illumination range can be provided.

Please refer to FIG. 10. An optical axis (not shown) of the second reflecting structure 3 can be interlaced with and inclined relative to the lens optical axis A. The first light L1 generated from the first light-emitting structure 4 includes at least one first projection light L11 projecting to the first reflecting structure 2. The first projection light L11 can be reflected by the first reflecting structure 2 to provide at least one first reflection light L12 that passes through the at least one second focal point 2b of the first reflecting structure 2. The second light L2 generated from the second light-emitting structure 5 includes at least one second projection light L21 projecting to the second reflecting structure 3. The second projection light L21 can be reflected by the second reflecting structure 3 to provide at least one second reflection light L22 that passes through the second focal point 3b of the second reflecting structure 3. In this embodiment, the light cut-off structure 7 has a top surface 73, and the second reflection light L22 can travel along the top surface 73 to pass through the second focal point 3b of the second reflecting structure 3.

Note that, in this embodiment, the projection direction of a portion of a first projection light L11 and the projection direction of a portion of a second projection light L21 are toward a predetermined direction y (i.e., an upward direction). For example, in the practical embodiment as shown in FIGS. 1 to 8, the first supporting surface 111 and the second supporting surface 121 both face the predetermined direction y, and the first light-emitting structure 4 and the second light-emitting structure 5 are respectively disposed along the first supporting surface 111 and the second supporting surface 121. Accordingly, a portion of a first projection light L11 and a portion of a second projection light L21 can respectively project to the first reflecting structure 2 and the second reflecting structure 3 along an upward direction (above the corresponding horizontal plane).

Figure 12:
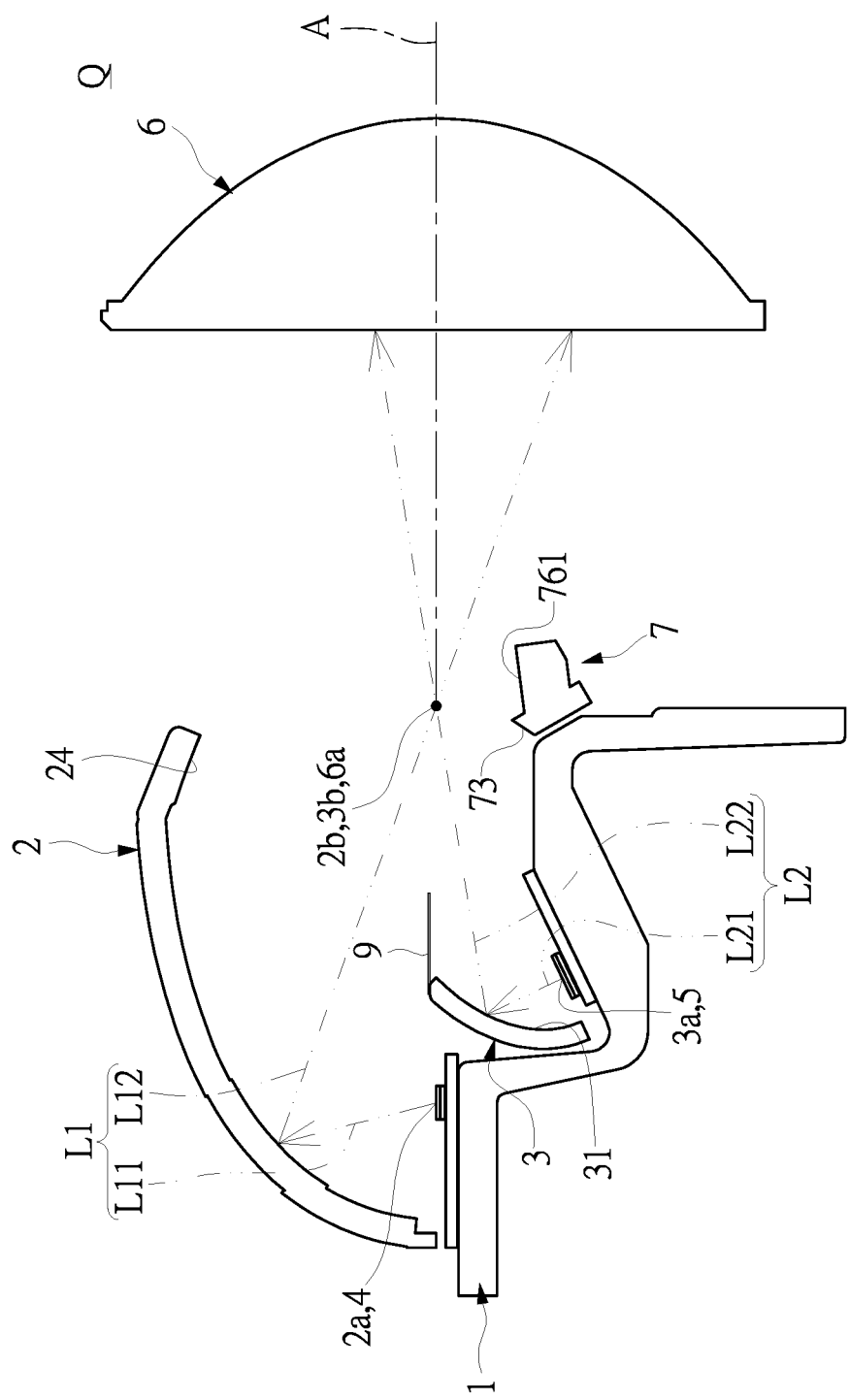
FIG. 12 is a side cross-sectional schematic view taken along the cut-line X-X of FIG. 1, and showing the high-beam state.

Please refer to FIGS. 11 and 12. The main difference shown in FIGS. 8 and 9 is that the light cut-off structure 7 as shown in FIG. 8 is in the low-beam state. The light cut-off structure 7 as shown in FIG. 8 is in the high-beam state. More specifically, the light cut-off structure 7 can rotate around the rotation axis I and has a predetermined pivot angle θ relative to the lens optical axis A. The light cut-off structure 7 can reciprocatingly swing in the predetermined pivot angle θ which can range between 15 and 35 degrees. Therefore, the vehicle lamp device Q can be switched between the low-beam and high-beam state by the reciprocating rotation of the vehicle lamp device Q.

Note that, the vehicle lamp device Q according to the first embodiment of the instant disclosure is not limited to the example concurrently including the first reflecting structure 2 and the second reflecting structure 3 or the example only including the first reflecting structure 2 or the second reflecting structure 3. The vehicle lamp device Q, according to requirements, can only use the main light-emitting structure 5 and the main reflecting structure 3 to produce a lighting pattern with a cut-off line by the light cut-off structure 7. In other embodiments, the light generated from the main light-emitting structure 5 can be reflected by the main reflecting structure 3 and subsequently be selectively shielded by a front cut-off edge 71 to produce the lighting pattern with the cut-off line.

Second Embodiment

Figure 13:
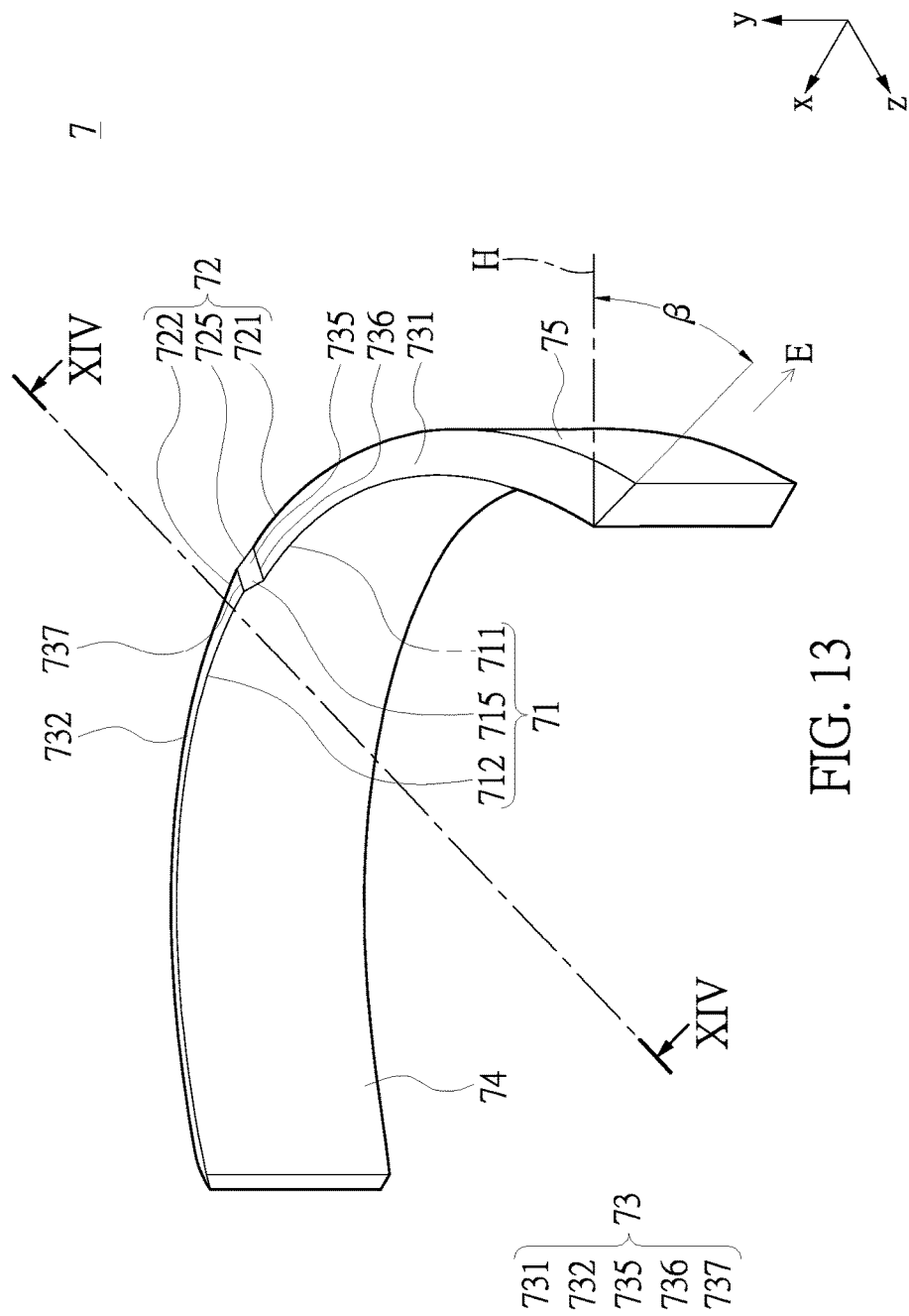
FIG. 13 is a three-dimensional schematic view of the light cut-off structure according to the second embodiment of the instant disclosure.
Figure 14:
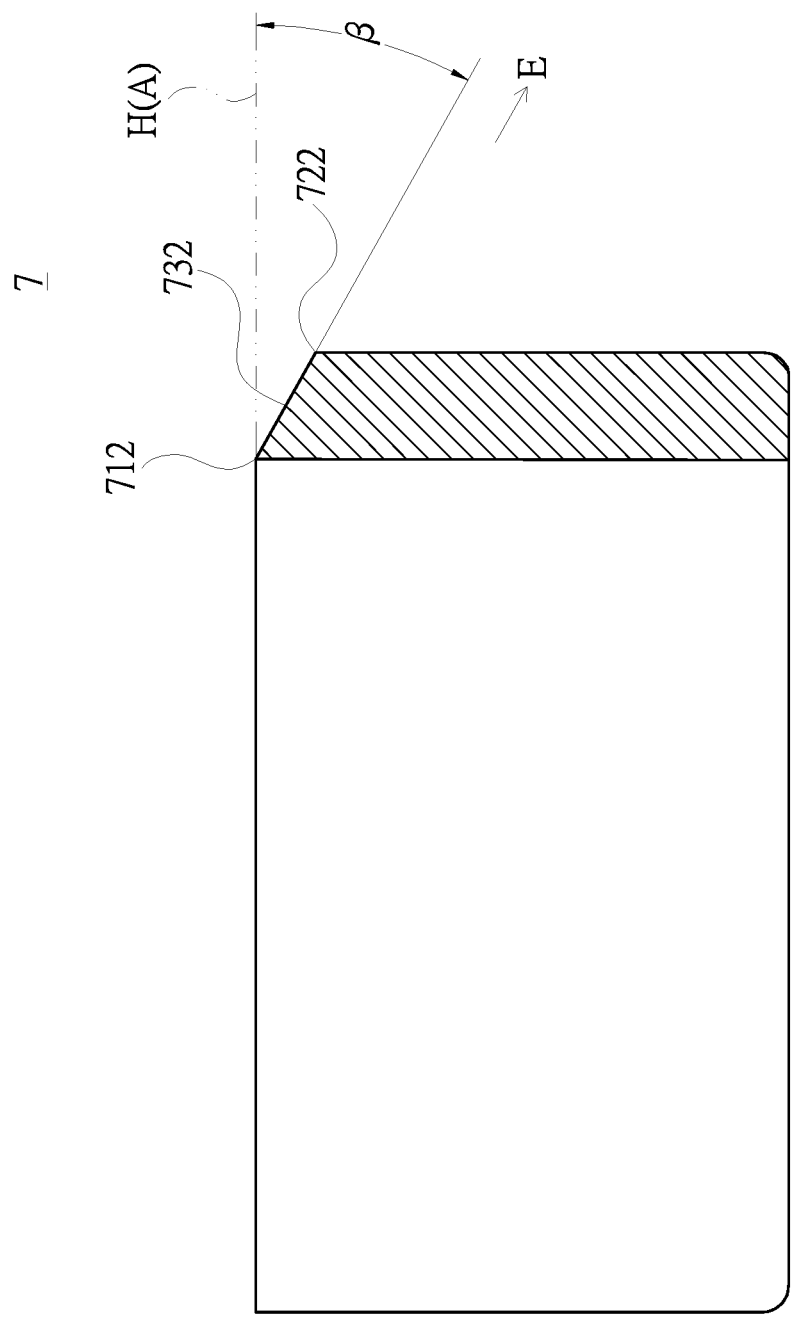
FIG. 14 is a side cross-sectional schematic view taken along the cut-line XIV-XIV of FIG. 13.

Please refer to FIGS. 13 and 14. FIGS. 13 and 14 are schematic views of the light cut-off structure 7 according this embodiment. Note that, the light cut-off structure 7 of this embodiment can be used to replace that of the first embodiment. The light cut-off structure 7 of this embodiment is suitable for the application that the second light-emitting structure 5 is positioned below the lens optical axis A, or the application that the second light-emitting structure 5 is positioned below the lens optical axis A and the first light-emitting structure 4 is positioned on or above the lens optical axis A. That is to say, for the vehicle lamp device Q of this embodiment, a straight-line distance between the first focal point 3a of the second reflecting structure 3 and the lens optical axis A is longer than that between the first focal point 2a of the first reflecting structure 2 and the lens optical axis A.

More specifically, the light cut-off structure 7 includes a front cut-off edge 71, a rear cut-off edge 72, and a top surface 73. The front cut-off edge 71 and the rear cut-off edge 72 are disposed in positional correspondence with each other, and the top surface 73 is disposed between the front cut-off edge 71 and the rear cut-off edge 72. The light cut-off structure 7 is configured to produce a cut-off line of low-beam lighting patterns in compliance with regulations of the motor-vehicle headlamp. Furthermore, as shown in FIG. 14, the extension direction toward the rear cut-off edge 72 from the front cut-off edge 71 can be defined as an inclination direction E. When the light cut-off structure 7 is in the low-beam state, a portion of the top surface 73 is inclined along the inclination direction E. The portion of the top surface 73 can have a predetermined inclination angle β relative to a horizontal plane H or the lens optical axis A of the vehicle lamp device Q. The predetermined inclination angle β can be greater than 0 degrees and less than 30 degrees, preferably between 1 and 25 degrees, more preferably between 15 and 25 degrees. The front cut-off edge 71 can be in an arc shape. Note, that, the horizontal plane H can be parallel to the lens optical axis A, or be parallel to and coincide with the lens optical axis A.

Please refer to FIG. 14. The main difference of the light cut-off structure 7 of this embodiment from the prior art is that a portion of the top surface 73 is inclined along the inclination direction E. That is to say, the portion of the top surface 73 extends toward the second light-emitting structure 5 at an inclination angle. Therefore, under the situation that the light cut-off structure 7 of this embodiment is applied to the vehicle lamp device Q of the first embodiment, the second reflection light L22 generated from the second light-emitting structure 5 can travel along the portion of the top surface 73 which is inclined relative to the horizontal plane H or the lens optical axis A and project through the second focal point 3b of the second reflecting structure 3. That is to say, the second reflection light L22 generated from the second light-emitting structure 5 can sequentially travel through the rear cut-off edge 72, the top surface 73, and the front cut-off edge 71.

Please refer to FIG. 13. The light cut-off structure 7 further includes a front side surface 74 and a rear side surface 75 opposite to the front side surface 74. The front side surface 74 is connected to the front cut-off edge 71 and the rear side surface 75 is connected to the rear cut-off edge 72. The top surface 73 is disposed between the front side surface 74 and the rear side surface 75. More specifically, the front cut-off edge 71 includes a first front edge segment 711, a second front edge segment 712, and a front transitional edge segment 715 connected between the first front edge segment 711 and the second front edge segment 712. The front transitional edge segment 715 can be inclined relative to the first front edge segment 711 and the second front edge segment 712. The rear cut-off edge 72 includes a first rear edge segment 721, a second rear edge segment 722, and a rear transitional edge segment 725 connected between the first rear edge segment 721 and the second rear edge segment 722. The top surface 73 includes a first reflecting surface 731, a second reflecting surface 732, a transitional reflecting surface 735 connected between the first reflecting surface 731 and the second reflecting surface 732, a first connecting line segment 736 disposed between the first reflecting surface 731 and the transitional reflecting surface 735, and a second connecting line segment 737 disposed between the second reflecting surface 732 and the transitional reflecting surface 735. In this embodiment, the first reflecting surface 731 and the second reflecting surface 732, and the transitional reflecting surface 735 are inclined along the predetermined inclination direction E, but are not limited thereto. Preferably, the front transitional edge segment 715 has a length shorter than that of the rear transitional edge segment 725. However, there is no limitation to the length of the front transitional edge segment 715. In other embodiments, the front transitional edge segment 715 can have a relatively longer length to selectively shield the lights of the first light-emitting structure 4 and the second light-emitting structure 5, so as to produce lighting patterns in compliance with regulations.

Please refer to FIG. 13. The first reflecting surface 731, the second reflecting surface 732, and the transitional reflecting surface 735 are disposed between the front cut-off edge 71 and the second cut-off edge 72. More specifically, the first reflecting surface 731 is disposed between the first front edge segment 711 and the first rear edge segment 721. The second reflecting surface 732 is disposed between the second front edge segment 712 and the second rear edge segment 722. The transitional reflecting surface 735 is disposed between the front transitional edge segment 715 and the rear transitional edge segment 725. The first connecting line segment 736 and the second connecting line segment 737 are disposed between the front cut-off edge 71 and the second cut-off edge 72, wherein the first connecting line segment 736 is unparallel to the second connecting line segment 737.

In the prior art, the front side surface 74 and the rear side surface 75 are at the same height level (i.e., the first front edge segment 711 and the first rear edge segment 721 are at the same height level, the second front edge segment 712 and the second rear edge segment 722 are at the same height level, and the front transitional edge segment 715 and the rear transitional edge segment 725 are at the same height level). Under the situation that the conventional light cut-off structure 7 is applied to the practical embodiment in which the second light-emitting structure 5 is disposed below the lens optical axis A, the second reflection light L22 of the second light-emitting structure 5 would be shielded by the rear side surface 75 of the conventional light cut-off structure 7. Compared to the prior art, a portion of the top surface 73 of the light cut-off structure 7 of this embodiment is inclined along the predetermined inclination direction E and has a predetermined inclination angle β relative to the horizontal plane H or the lens optical axis A of the vehicle lamp device Q. Therefore, the light flux of the second light L2 projecting through the second focal point 3b of the second reflecting structure 3 can be increased. The predetermined inclination angle β can be greater than 0 degrees and less than 30 degrees, preferably between 1 and 25 degrees, more preferably between 15 and 25 degrees. Note that, the portion of the top surface 73 is inclined along the predetermined inclination direction E, such that the second light L2 can contribute to the hot spot region of the low-beam lighting pattern. The horizontal plane H (x-z plane) is a virtual plane and substantially parallel to the lens optical axis A.

Third Embodiment

Figure 15:
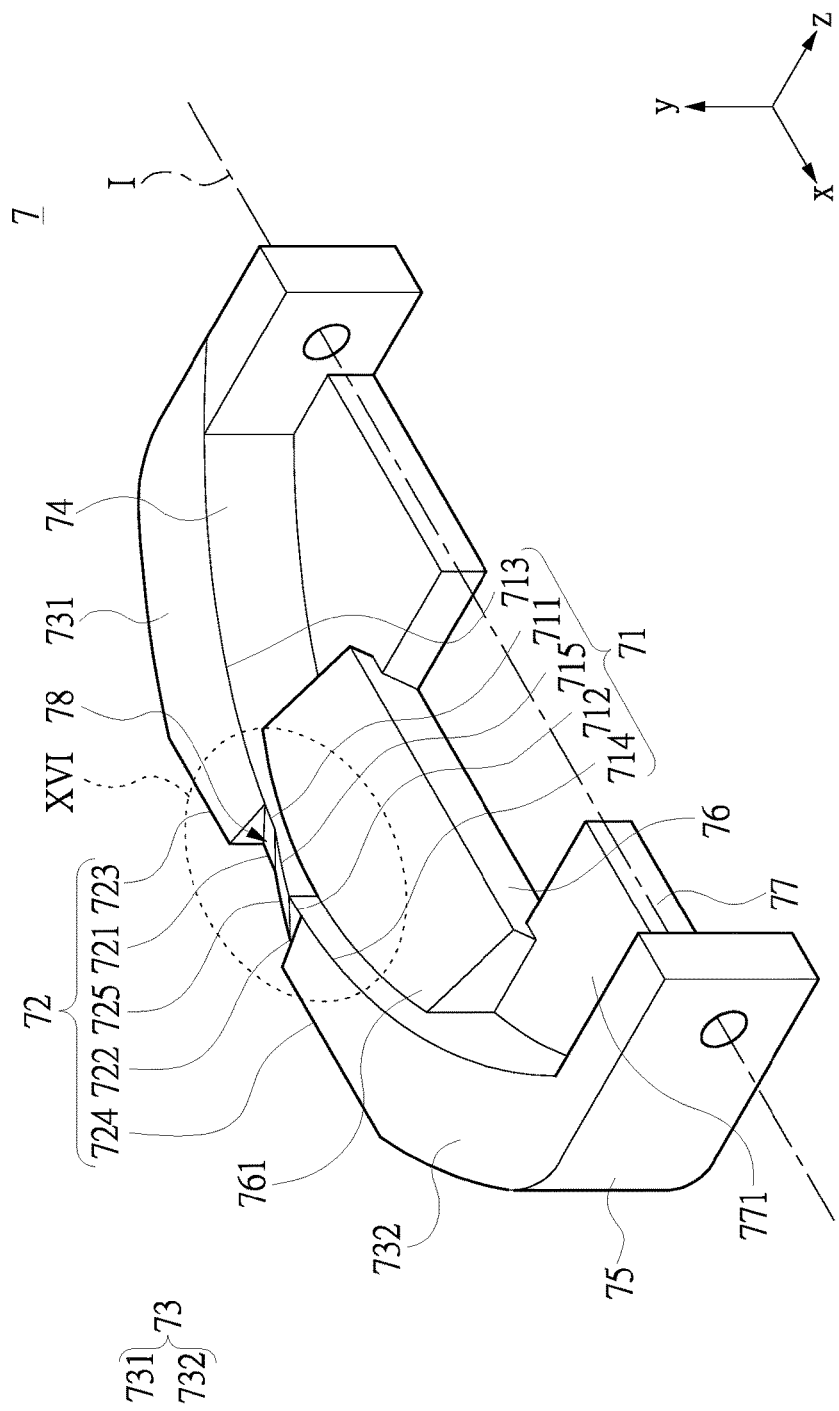
FIG. 15 is a three-dimensional schematic view of the light cut-off structure according to the third embodiment of the instant disclosure.
Figure 16:
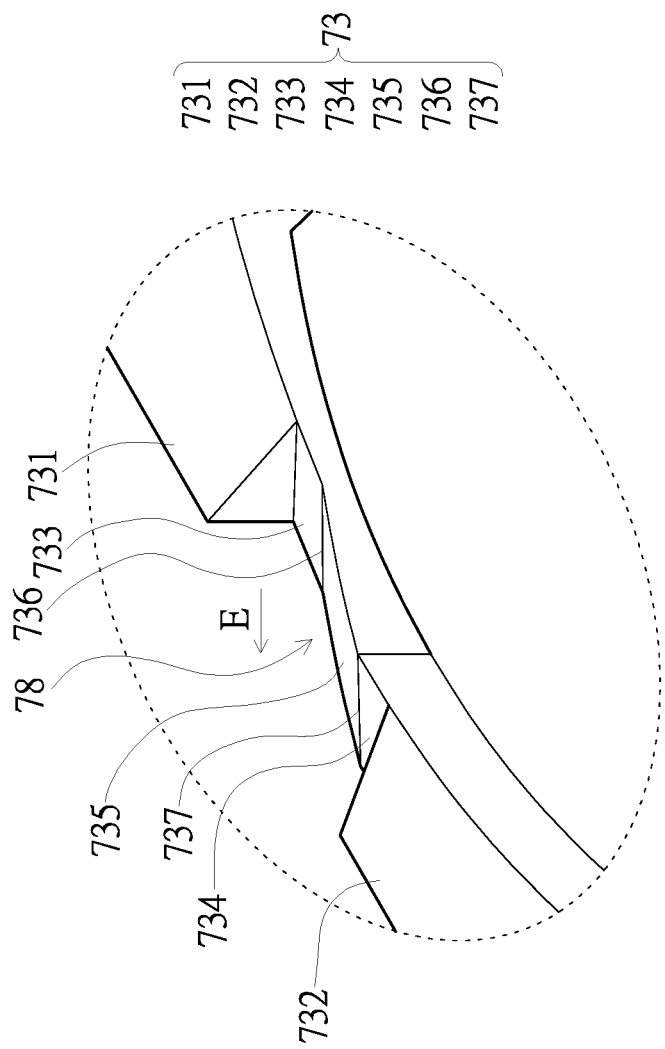
FIG. 16 is an enlarged view of the section XVI shown in FIG. 15.
Figure 17:
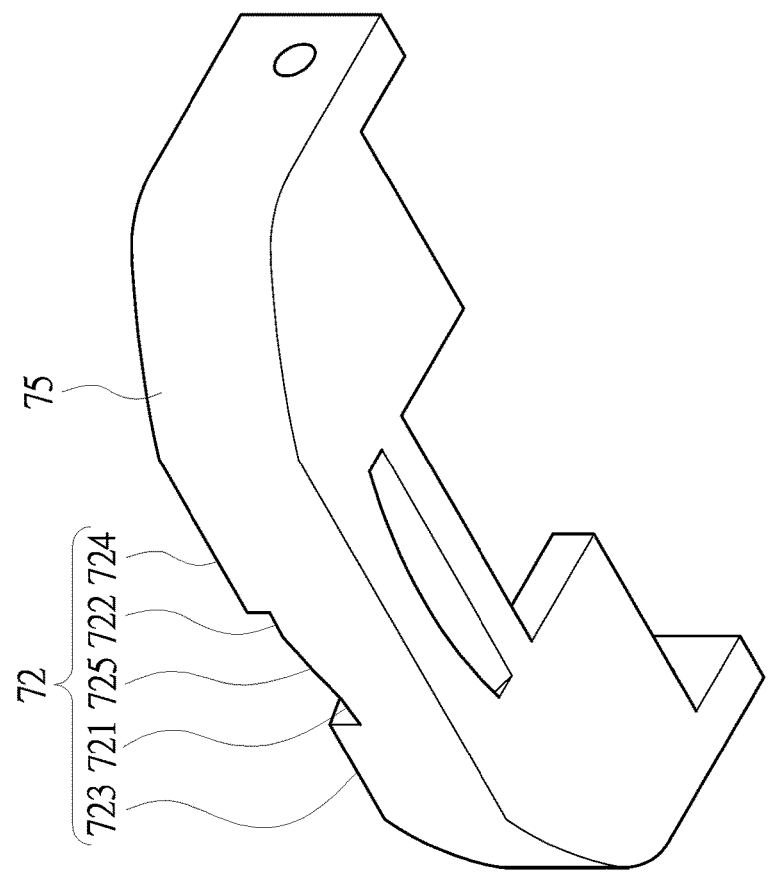
FIG. 17 is another three-dimensional schematic view of the light cut-off structure according to the third embodiment of the instant disclosure.
Figure 18:
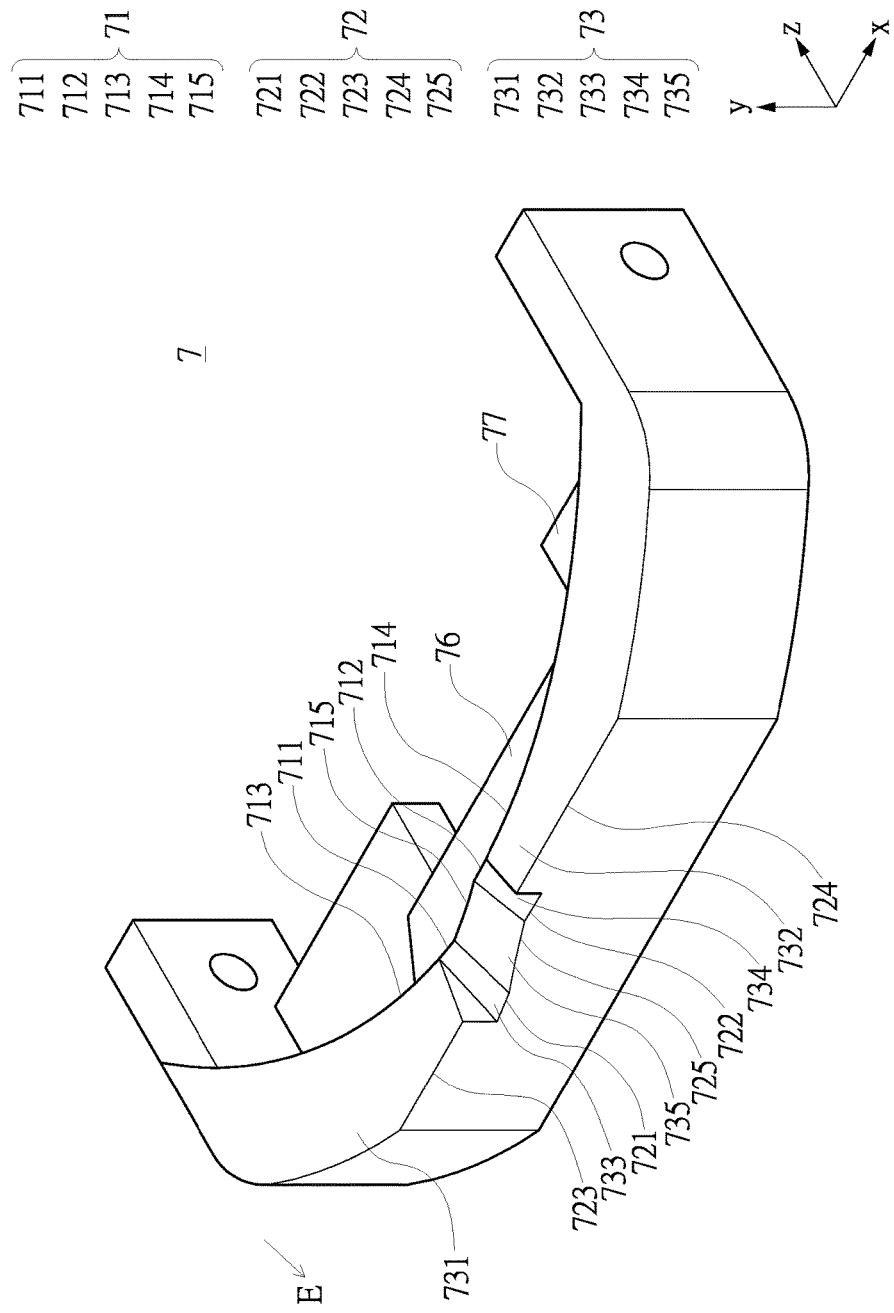
FIG. 18 is still another three-dimensional schematic view of the light cut-off structure according to the third embodiment of the instant disclosure.
Figure 19:
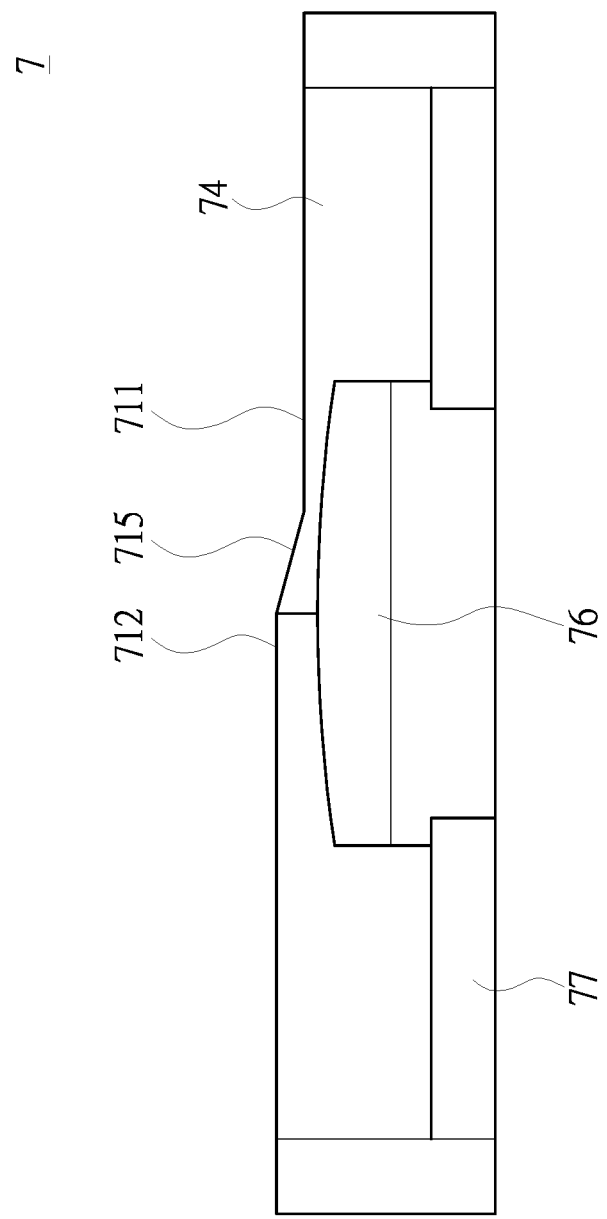
FIG. 19 is a front schematic view of the light cut-off structure according to the third embodiment of the instant disclosure.
Figure 20:
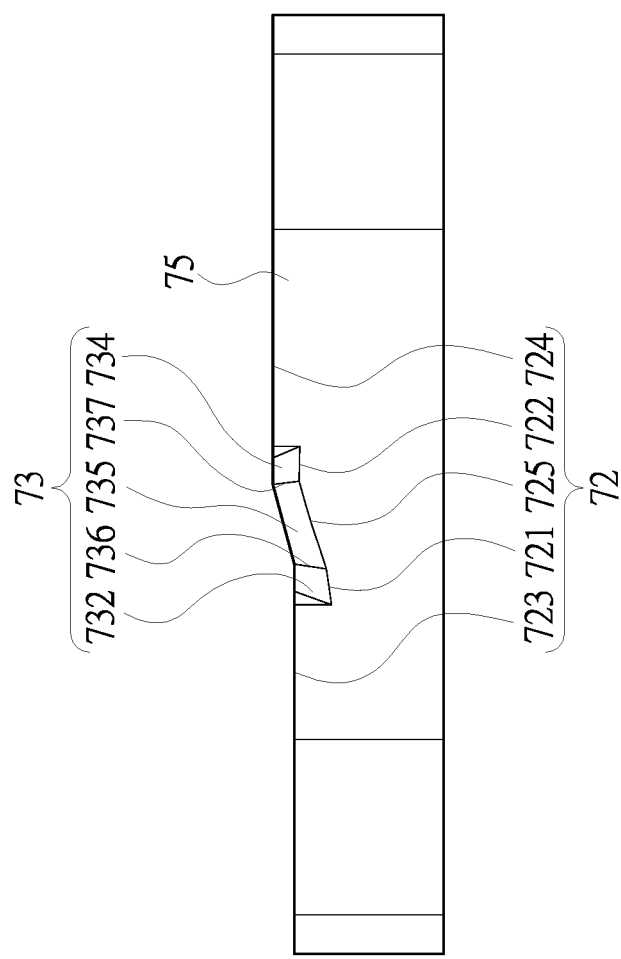
FIG. 20 is a rear schematic view of the light cut-off structure according to the third embodiment of the instant disclosure.

Please refer to FIGS. 15 to 18 together with FIGS. 19 and 20. The third embodiment of the instant disclosure provides a light cut-off structure 7 which can be applied to the vehicle lamp device Q. The main difference between this embodiment as shown in FIG. 15 and the second embodiment as shown in FIG. 13 is that the light cut-off structure 7 of this embodiment is formed with a recess structure 78. In addition, the first reflecting surface 731 and the second reflecting surface 732 of the light cut-off structure 7 of this embodiment are substantially parallel to the lens optical axis A. More specifically, the light cut-off structure 7 includes a front cut-off edge 71, a rear cut-off edge 72, and a top surface 73. The rear cut-off edge 72 and the front cut-off edge 71 are disposed in positional correspondence with each other, and the top surface 73 is disposed between the front cut-off edge 71 and the rear cut-off edge 72. The extension direction toward the rear cut-off edge 72 from the front cut-off edge 71 can be defined as an inclination direction E. A portion of the top surface 73 can have a predetermined inclination angle β relative to the horizontal plane H or the lens optical axis A of the vehicle lamp device Q. The predetermined inclination angle β can be greater than 0 degrees and less than 30 degrees, preferably between 1 and 25 degrees, more preferably between 15 and 25 degrees. Therefore, a lighting pattern with a cut-off line in compliance with regulations of the car headlamp can be produced when at least one light is selectively shielded by the front cut-off edge 71.

Please refer to FIGS. 15 to 18. The light cut-off structure 7 further includes a front side surface 74 and a rear side surface 75 opposite to the front side surface 74. The front side surface 74 is connected to the front cut-off edge 71 and the rear side surface 75 is connected to the rear cut-off edge 72. The top surface 73 is disposed between the front side surface 74 and the rear side surface 75. More specifically, the front cut-off edge 71 includes a first front edge segment 711, a second front edge segment 712, and a front transitional edge segment 715 connected between the first front edge segment 711 and the second front edge segment 712. The front transitional edge segment 715 can be inclined relative to the first front edge segment 711 and the second front edge segment 712. The rear cut-off edge 72 includes a first rear edge segment 721, a second rear edge segment 722, and a rear transitional edge segment 725 connected between the first rear edge segment 721 and the second rear edge segment 722. Furthermore, the front cut-off edge 71 of the light cut-off structure 7 further includes a third front edge segment 713 connected to the first front edge segment 711 and a fourth front edge segment 714 connected to the second front edge segment 712. The rear cut-off edge 72 further includes a third rear edge segment 723 connected to the first rear edge segment 721 and a fourth rear edge segment 724 connected to the second rear edge segment 722. Note that, in other embodiments, the first front edge segment 711 and the third front edge segment 713 can be the integrated into one segment. The second front edge segment 712 and the fourth front edge segment 714 can be the integrated into one segment. The first front edge segment 711 is disposed between the third front edge segment 713 and the front transitional edge segment 715. The first rear edge segment 721 is disposed between the third rear edge segment 723 and the rear transitional edge segment 725.

Please refer to FIGS. 15 to 18. The top surface 73 includes a first reflecting surface 731, a second reflecting surface 732, and a transitional reflecting surface 735 connected between the first reflecting surface 731 and the second reflecting surface 732. Compared to the second embodiment, the light cut-off structure 7 of this embodiment further includes a third reflecting surface 733 and a fourth reflecting surface 734. Furthermore, the top surface 73 further includes a first connecting line segment 736 and a second connecting line segment 737 which are disposed between the front cut-off edge 71 and the rear cut-off edge 72. The transitional reflecting surface 735 is disposed between the first connecting line segment 736 and the second connecting line segment 737. Preferably, the first connecting line segment 736 is unparallel to the second connecting line segment 737, but is not limited thereto. The first connecting line segment 736 is disposed between the third reflecting surface 733 and the transitional reflecting surface 735. The second connecting line segment 737 is disposed between the fourth reflecting surface 734 and the transitional reflecting surface 735.

More specifically, the first reflecting surface 731 is disposed between the third front edge segment 713 and the third rear edge segment 723. The second reflecting surface 732 is disposed between the fourth front edge segment 714 and the fourth rear edge segment 724. The transitional reflecting surface 735 is disposed between the front transitional edge segment 715 and the rear transitional edge segment 725. The third reflecting surface 733 is disposed between the first reflecting surface 731 and the transitional reflecting surface 735. The fourth reflecting surface 734 is disposed between the second reflecting surface 732 and the transitional reflecting surface 735. In other words, the first reflecting surface 731 is disposed between the third front edge segment 713, the third rear edge segment 723, and the third reflecting surface 733. The second reflecting surface 732 is disposed between the fourth front edge segment 714, the fourth rear edge segment 724, and the fourth reflecting surface 734. The transitional reflecting surface 735 can be disposed between the front transitional edge segment 715 and the rear transitional edge segment 725. Note that, the first reflecting surface 731 is not coplanar to the third reflecting surface 733, and the second reflecting surface 732 is not coplanar to the fourth reflecting surface 734. Preferably, in the third embodiment, the first reflecting surface 731 and the second reflecting surface 732 can be substantially parallel to the horizontal plane H or the lens optical axis A, or parallel to the lens optical axis A of the vehicle lamp device Q. Note that, in the third embodiment, the first reflecting surface 731 and the second reflecting surface 732 can be parallel to the horizontal plane H or the lens optical axis A of the vehicle lamp device Q, such that the brightness of the light-diffusing area (i.e., points 25L2, 25R1, 25L3, 25R2, 15L, and 15R regulated by ECE R98 and points 25L and 25R regulated by ECE R112) can be increased.

Furthermore, the light cut-off structure 7 has a recess structure 78 constituted by the third reflecting surface 733, the fourth reflecting surface 734, and the transitional reflecting surface 735 of the top surface 73. In other words, the recess structure 78 is recessed in the top surface 73 and disposed between the front cut-off edge 71 and the rear cut-off edge 72. The transitional reflecting surface 735 of the recess structure 78 recessed in the top surface 73 is inclined along the inclination direction E. Therefore, at least one light generated from the second light-emitting structure 5 can sequentially pass through the rear cut-off edge 72, the transitional reflecting surface 735, and the front cut-off edge 71, and a lighting pattern with a cut-off line can be produced when the emitted light is selectively shielded by the front cut-off edge 71.

Please refer to FIGS. 15 to 18. The light cut-off structure 7 further includes a residual-light reflecting plate 76 disposed on the front side surface 74. The residual-light reflecting plate 76 has a residual-light reflecting surface 761. The residual-light reflecting plate 76 is configured to further provide the illumination of the dark zone (i.e., Zone III in compliance with regulations). More specifically, when the light cut-off structure 7 is in the low-beam state, the residual-light reflecting surface 761 can be inclined at an angle of between 10 and 50 degrees relative to the horizontal plane H, but is not limited thereto. The inclination angle of the residual-light reflecting surface 761 can be adjusted according to a reflecting plate 24 of the first reflecting structure 2 of the first embodiment as shown in FIGS. 10 and 22.

Figure 21:
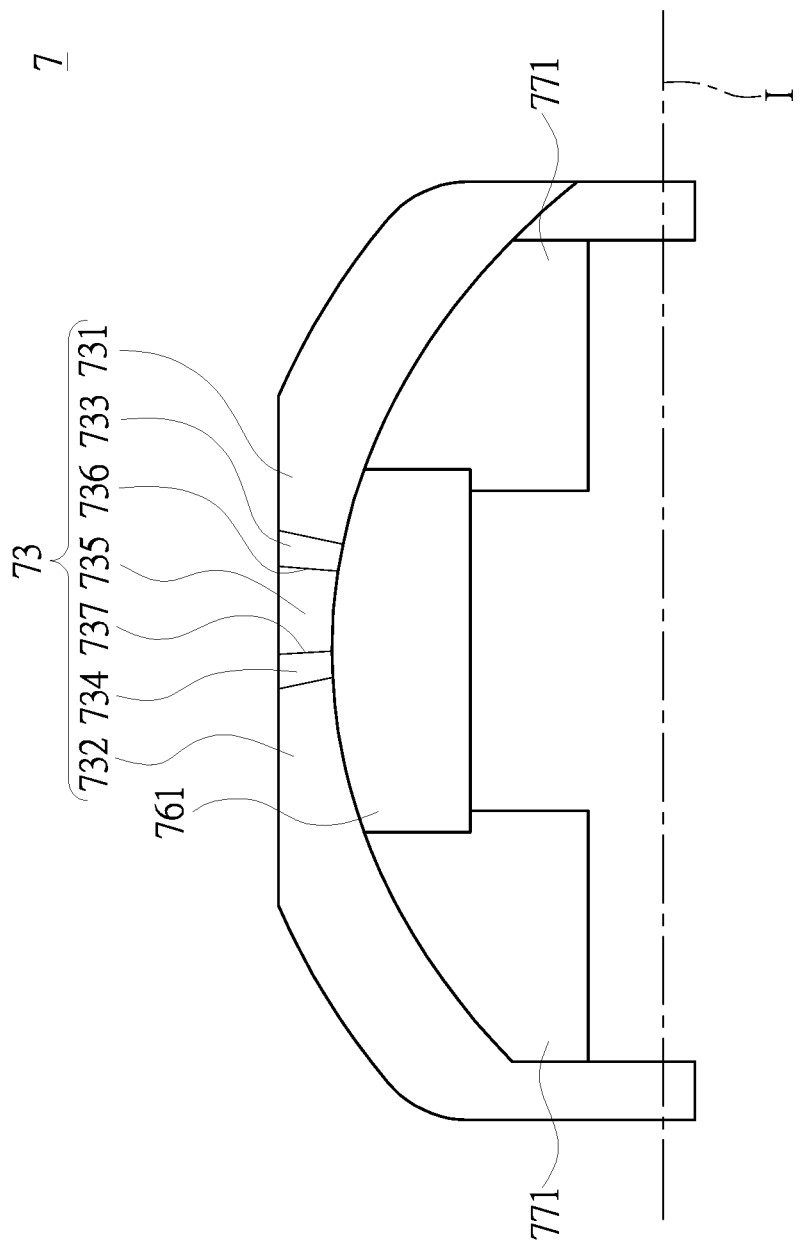
FIG. 21 is a top schematic view of the light cut-off structure according to the third embodiment of the instant disclosure.
Figure 26:
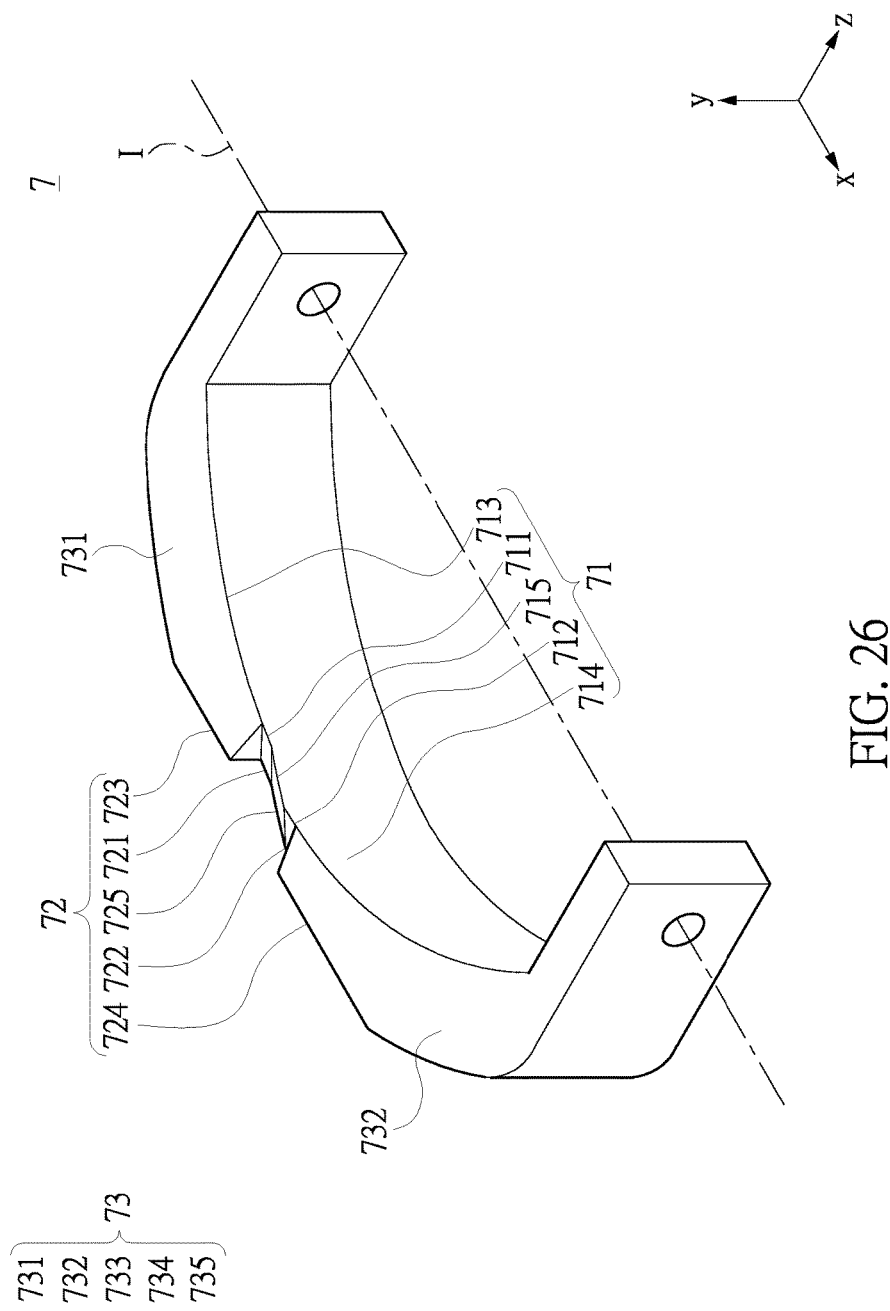
FIG. 26 is still another three-dimensional schematic view of the light cut-off structure according to the third embodiment of the instant disclosure.
Figure 27:
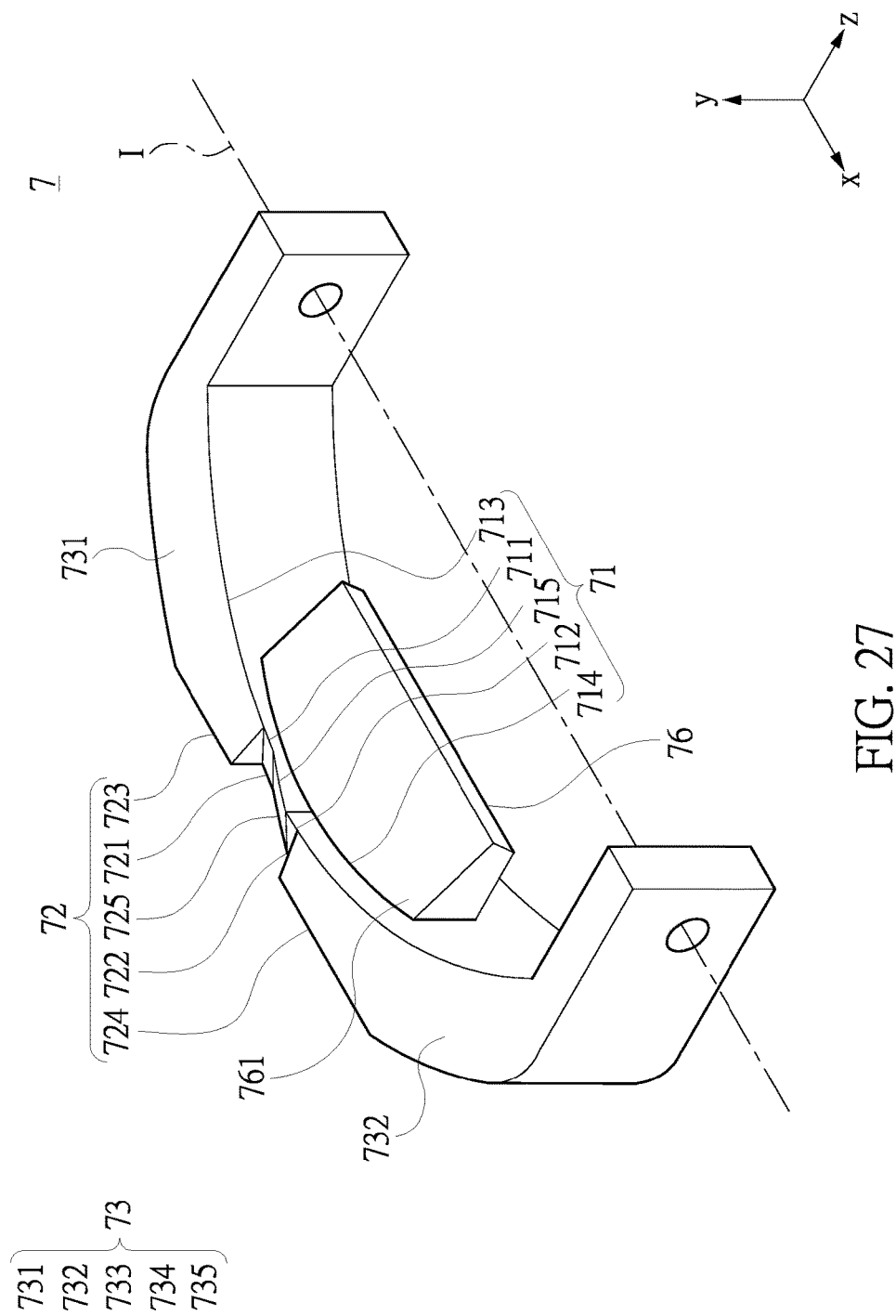
FIG. 27 is another three-dimensional schematic view of the light cut-off structure according to the third embodiment of the instant disclosure.

Please refer to FIGS. 15, 19 and 21. The light cut-off structure 7 can further include a lighting pattern modifying plate 77 which can be disposed on the front side surface 74. In this embodiment, the light cut-off structure 7 further includes two lighting pattern modifying plates 77. The two lighting pattern modifying plates 77 are both disposed on the front side surface 74, and respectively positioned on two opposite sides of the residual-light reflecting plate 76. In the presence of the lighting pattern modifying plate 77, the illumination range in the low-beam state can be modified. Note that, the light cut-off structure 7 with the lighting pattern modifying plate 77 is suitably applied to the first or the second light-emitting structure 4, 5 with non-continuous chips in which a predetermined distance between two adjacent chips is provided. However, as shown in FIGS. 26 and 27, the light cut-off structure 7 can be designed to have one, both, or none of the residual-light reflecting plate 76 and the lighting pattern modifying plates 77, and also can use the recess structure 78 to enhance the luminous efficiency.

Figure 22:
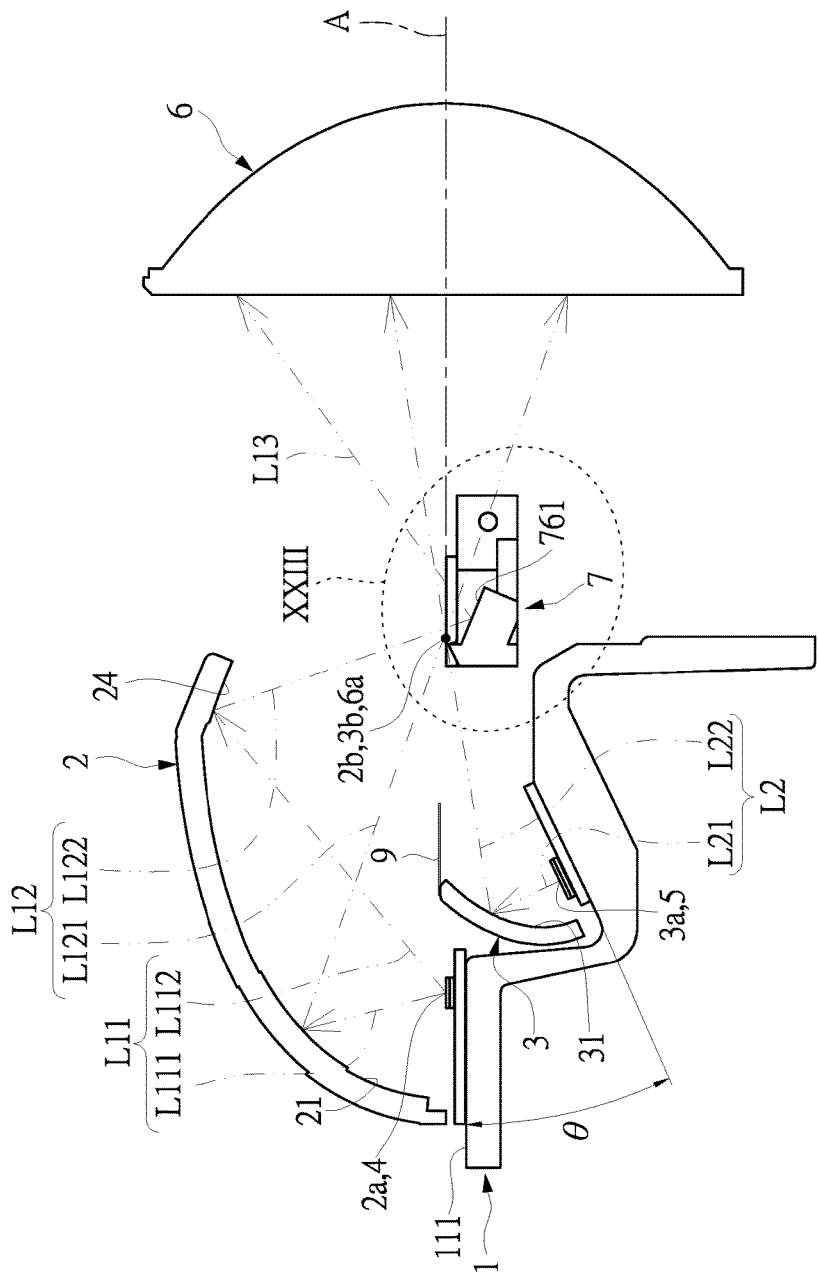
FIG. 22 is a side schematic view of the vehicle lamp device applied with the light cut-off structure according to the third embodiment of the instant disclosure.
Figure 23:
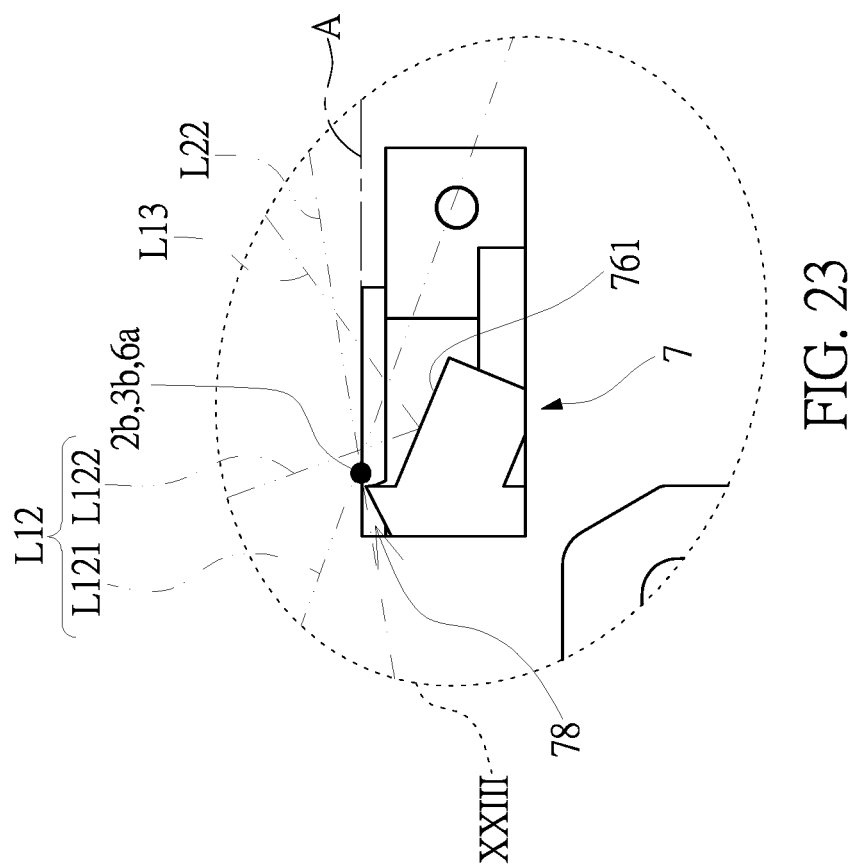
FIG. 23 is an enlarged view of the section XXIII shown in FIG. 22.
Figure 24:
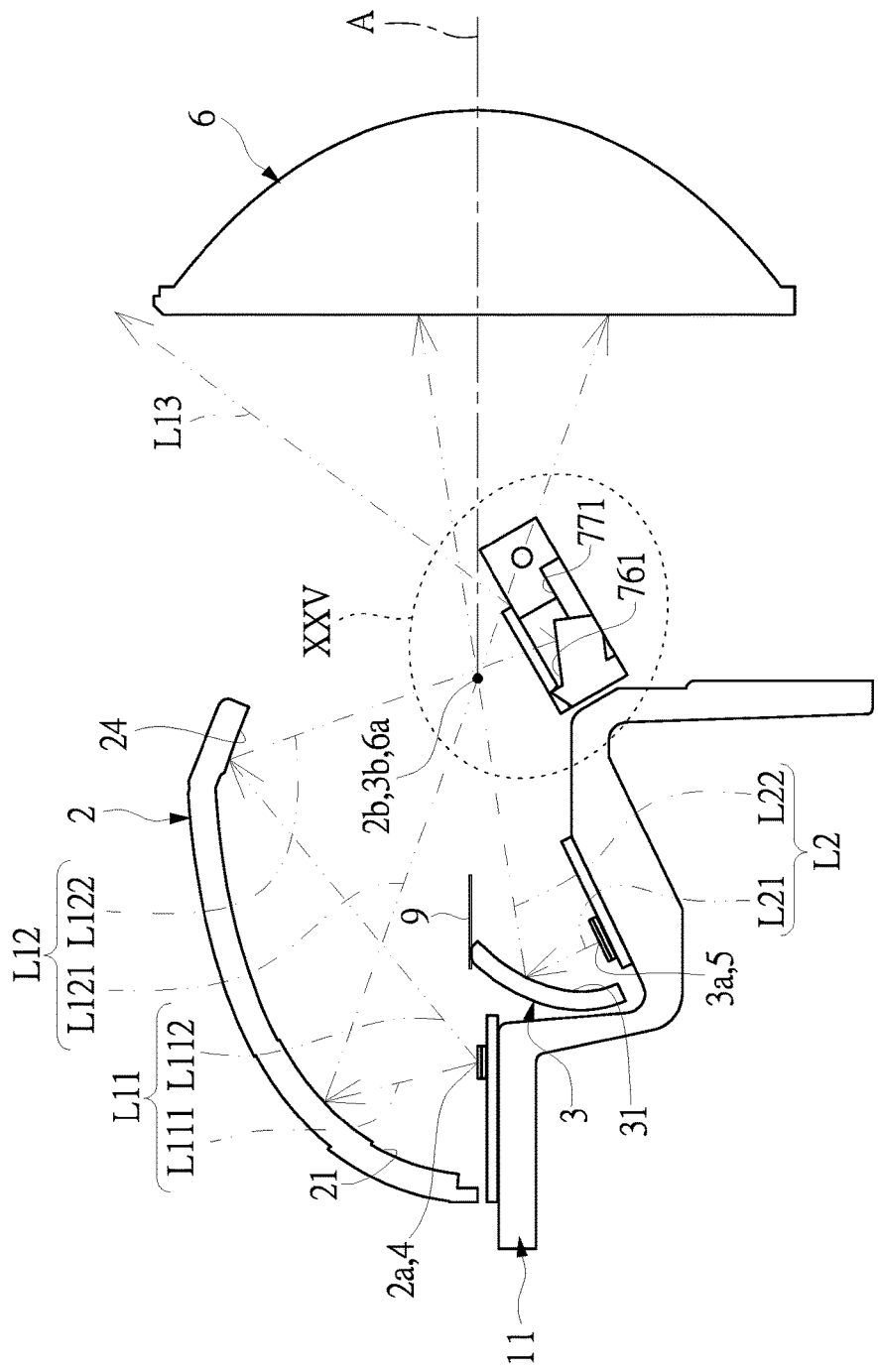
FIG. 24 is another side schematic view of the vehicle lamp device applied with the light cut-off structure according to the third embodiment of the instant disclosure.
Figure 25:
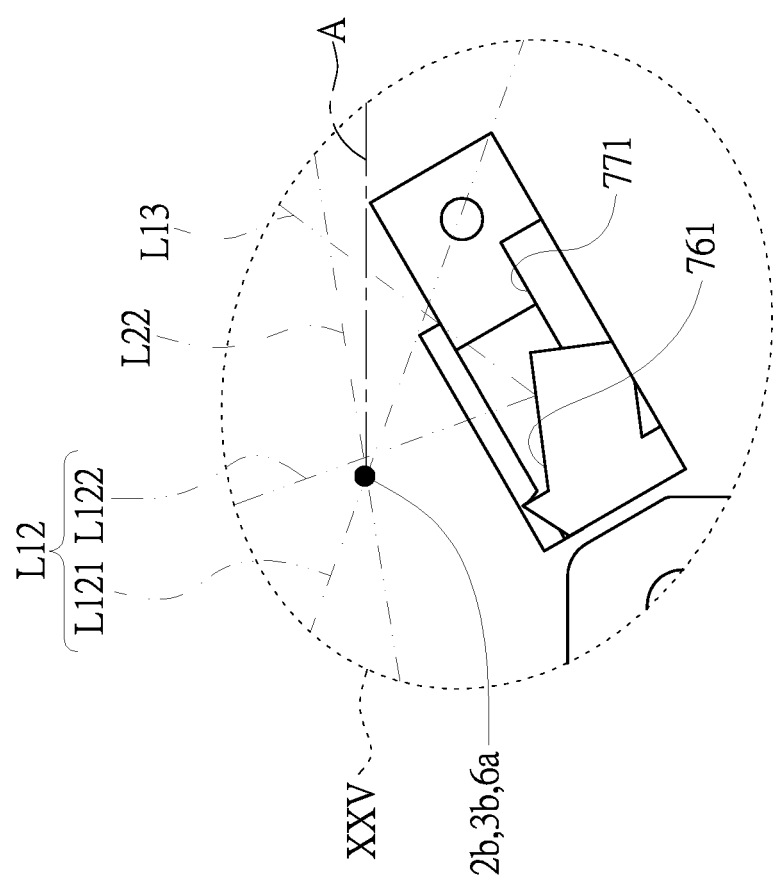
FIG. 25 is an enlarged view of the section XXV shown in FIG. 24.

Please refer to FIGS. 22 to 25. FIG. 22 is a schematic view showing the low-beam of the light cut-off structure 7. FIG. 24 is a schematic view showing the high-beam of the light cut-off structure 7. The following will describe in details the light path of the light projected to the light cut-off structure 7. Preferably, in this embodiment, no matter the light cut-off structure 7 is in the low-beam state or the high-beam state, the first light-emitting structure 4 and the second light-emitting structure 5 can be concurrently turned on to respectively generate a first light L1 and a second light L2. More specifically, as shown in FIGS. 22 and 23, the first reflecting structure 2 of the vehicle lamp device Q can further include a reflecting plate 24. The first light L1 generated from the first light-emitting structure 4 can include a first projection light L11 projecting to the first reflecting structure 2. A portion of the first projection light L111 can project to a first reflecting surface 21 of the first reflecting structure 2. Another portion of the first projection light L112 can project to the reflecting plate 24 of the first reflecting structure 2. After that, the portion of the first projection light L111 is reflected by the first reflecting surface 21 of the first reflecting structure 2 to provide a first reflection light L121 passing through the second focal point 2b of the first reflecting structure 2. The another portion of the first projection light L112 is reflected by the reflecting plate 24 of the first reflecting structure 2 to provide another first reflection light L122 projecting to the residual-light reflecting surface 761 of the residual-light reflecting plate 76 of the light cut-off structure 7. After that, the another first reflection light L122 is reflected by the residual-light reflecting plate 76 of the light cut-off structure 7 to provide a first incidence light L13 projecting to the lens structure 6. Therefore, the first incidence light L13 can be projected toward a direction above the corresponding horizontal plane. Accordingly, the first incidence light L13 can provide the illumination of the dark zone (i.e., Zone III in compliance with regulations). In addition, the first light L11 can further include still another first projection light (not shown). The still another first projection light can project to the first reflecting surface 21 of the first reflecting structure 2. After that, the still another first projection light can be reflected by the first reflecting surface 21 to provide still another first reflection light (not shown) projecting to the first reflecting surface 731 and the second reflecting surface 732 of the light cut-off structure 7. After that, the still another first reflection light can be reflected by the first reflecting surface 731 and the second reflecting surface 732 and then project to left and right side regions of the hot spot region (i.e., points 25R and 25L regulated by ECE R112 or points 25L2, 25R1, 25L3, 25R2, 15L, and 15R regulated by ECE R98), so as to enhance the light diffusing effect.

Furthermore, the second light L2 generated from the second light-emitting structure 5 includes a second projection light L21 projecting to the second reflecting structure 3. After that, the second projection light L21 is reflected by the second reflecting structure 3 to provide a second reflection light L22 passing through the second focal 3b of the second reflecting structure 3. In this embodiment, the second reflection light L22 can travel along the recess structure 78 of the light cut-off structure 7 to pass through the second focal point 3b of the second reflecting structure 3. Note that, when the light cut-off structure 7 is in the high-beam state, the lighting pattern modifying plates 77 can be used to modify the high-beam lighting pattern so as to obtain desired sharp patterns.

One benefit of the instant disclosure is that: the vehicle lamp device and the light cut-off structure thereof according to the embodiments of the instant disclosure can utilize the technical feature about "the top surface in which a portion thereof is inclined along the inclination" to enhance the light condensing effect.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A light cut-off structure, comprising:
   a front cut-off edge;

a rear cut-off edge, corresponding in position to the rear cut-off edge; and a top surface, connected between the front cut-off edge and the rear cut-off edge, wherein a portion of the top surface is inclined along an inclination direction from the front cut-off edge toward the rear cut-off edge, the portion of the top surface has a predetermined inclination angle relative to a horizontal plane or a lens optical axis, and the predetermined inclination angle is greater than 0 degrees and less than 30 degrees;

wherein when at least one emitted light is selectively shielded by the front cut-off edge, a lighting pattern with a cut-off line is formed.

2. The light cut-off structure of claim 1, further comprising a front side surface and a rear side surface opposite to the front side surface, wherein the front cut-off edge includes a first front edge segment, a second front edge segment, and a front transitional edge segment connected or disposed between the first front edge segment and the second front edge segment, and the rear cut-off edge includes a first rear edge segment, a second rear edge segment, and a rear transitional edge segment connected or disposed between the first rear edge segment and the second rear edge segment.

3. The light cut-off structure of claim 2, wherein the top surface includes a first reflecting surface, a second reflecting surface, and a transitional reflecting surface connected or disposed between the first reflecting surface and the second reflecting surface, the first reflecting surface is disposed between the first front edge segment and the first rear edge segment, the second reflecting surface is disposed between the second front edge segment and the second rear edge segment, and the transitional reflecting surface is disposed between the front transitional edge segment and the rear transitional edge segment.

4. The light cut-off structure of claim 3, wherein the top surface further includes a first connecting line segment and a second connecting line segment, the first connecting line segment and the second connecting line segment are disposed between the front cut-off edge and the rear cut-off edge, the transitional reflecting surface is disposed between the first connecting line segment and the second connecting line segment, and the first connecting line segment is unparallel to the second connecting line segment.

5. The light cut-off structure of claim 3, wherein the front cut-off edge is arc-shaped.

6. The light cut-off structure of claim 3, wherein the front transitional edge segment has a length shorter than that of the rear transitional edge segment.

7. The light cut-off structure of claim 2, wherein the front cut-off edge further includes a third front edge segment connected to the first front edge segment and a fourth front edge segment connected to the second front edge segment, and the rear cut-off edge further includes a third rear edge segment connected to the first rear edge segment and a fourth rear edge segment connected to the second rear edge segment.

8. The light cut-off structure of claim 7, wherein the top surface includes a first reflecting surface, a second reflecting surface, and a transitional reflecting surface connected between the first reflecting surface and the second reflecting surface, the first reflecting surface is disposed between the third front edge segment and the third rear edge segment, the second reflecting surface is disposed between the fourth front edge segment and the fourth rear edge segment, and the transitional reflecting surface is disposed between the front transitional edge segment and the rear transitional edge segment.

9. The light cut-off structure of claim 8, further comprising a third reflecting surface and a fourth reflecting surface, wherein the third reflecting surface is disposed between the first reflecting surface and the transitional reflecting surface, the fourth reflecting surface is disposed between the second reflecting surface and the transitional reflecting surface, and the first reflecting surface and the second reflecting surface are substantially parallel to the horizontal plane or the lens optical axis.

10. The light cut-off structure of claim 9, further comprising a residual-light reflecting plate disposed on the front side surface, wherein the residual-light reflecting plate has a residual-light reflecting surface having an angle of between 10 and 50 degrees relative to the horizontal plane or the lens optical axis.

11. The light cut-off structure of claim 10, further comprising two lighting pattern modifying plates disposed on the front side surface and respectively on two opposite sides of the residual-light reflecting plate.

12. The light cut-off structure of claim 8, further comprising a lighting pattern modifying plate disposed on the front side surface.

13. The light cut-off structure of claim 1, wherein the cut-off line in compliance with regulations of a car headlight.

14. The light cut-off structure of claim 1, wherein a recess structure is constituted by the third reflecting surface, the fourth reflecting surface, and the transitional reflecting surface of the top surface.

15. A vehicle lamp device, comprising:

a supporting mount;

a first reflecting structure, disposed on the supporting mount and having at least one first focal point and at least one second focal point corresponding in position to the at least one first focal point;

a second reflecting structure, disposed on the supporting mount and having a first focal point and a second focal point corresponding in position to the first focal point, wherein the second focal point of the second reflecting structure coincides with or is in the vicinity of the second focal point of the first reflecting structure;

a first light-emitting structure, disposed on the supporting mount and in exact positional correspondence with the at least one first focal point of the first reflecting structure;

a second light-emitting structure, disposed on the supporting mount and in exact positional correspondence with the first focal point of the second reflecting structure;

a lens structure, having a lens optical axis and a lens focal point on the lens optical axis, wherein the at least one second focal point of the first reflecting structure and the second focal point of the second reflecting structure are positioned on or near the lens optical axis; and a light cut-off structure, disposed on the supporting mount and including a front cut-off edge, a rear cut-off edge corresponding in position to the rear cut-off edge, and a top surface connected between the front cut-off edge and the rear cut-off edge, wherein the top surface is inclined along an inclination direction from the front cut-off edge toward the rear cut-off edge, the top surface has a predetermined inclination angle relative to a horizontal plane or a lens optical axis, and the predetermined inclination angle is greater than 0 degrees and less than 30 degrees;

wherein when at least one emitted light is selectively shielded by the front cut-off edge, a lighting pattern with a cut-off line is formed.

16. The vehicle lamp device of claim 15, wherein the at least one first focal point of the first reflecting structure and the first focal point of the second reflecting structure are positioned on two opposite sides of the lens optical axis.

17. The vehicle lamp device of claim 15, wherein the supporting mount has a first supporting surface and a second supporting surface, the first supporting surface and the second supporting surface face in a direction that a horizontal plane faces, and wherein a first light generated from the first light-emitting structure includes a first projection light projecting to the first reflecting structure and a second light generated from the second light-emitting structure includes a second projection light projecting to the second reflecting structure, and a portion of the first projection light and a portion of the second projection light project toward a predetermined projection direction.

18. The vehicle lamp device of claim 15, wherein a second light generated from the second light-emitting structure includes a second projection light projecting to the second reflecting structure, and the second projection light is reflected by the second reflecting structure to provide a second reflection light passing through the second focal point of the second reflecting structure along the top surface.

19. The vehicle lamp device of claim 15, wherein the light cut-off structure is configured to reciprocatingly swing between a first position and a second position.

20. A light cut-off structure, comprising:
a front cut-off edge;
a rear cut-off edge, corresponding in position to the rear cut-off edge, wherein an inclination direction is defined from the front cut-off edge toward the rear cut-off edge;
a top surface, disposed between the front cut-off edge and the rear cut-off edge; and
a recess structure, recessed in the top surface and disposed between the front cut-off edge and the rear cut-off edge, wherein the recess structure has a transitional reflecting surface that is inclined along the inclination direction;

wherein at least one emitted light sequentially passes through the rear cut-off edge, the transitional reflecting surface, and the front cut-off edge, and a lighting pattern with a cut-off line is formed when the at least one emitted light is selectively shielded by the front cut-off edge.

21. A vehicle lamp device, comprising:
a supporting mount;
a main reflecting structure, disposed on the supporting mount and having a first focal point and a second focal point corresponding in position to the first focal point;
a main light-emitting structure, disposed on the supporting mount and in exact positional correspondence with the first focal point of the main reflecting structure;
a lens structure, having a lens optical axis and a lens focal point on the lens optical axis, wherein the second focal point of the main reflecting structure is positioned on or near the lens optical axis; and
a light cut-off structure, disposed on the supporting mount and including a front cut-off edge, a rear cut-off edge corresponding in position to the rear cut-off edge, and a top surface connected between the front cut-off edge and the rear cut-off edge, wherein the top surface is inclined along an inclination direction from the front cut-off edge toward the rear cut-off edge, the top surface has a predetermined inclination angle relative to a horizontal plane or a lens optical axis, and the predetermined inclination angle is greater than 0 degrees and less than 30 degrees;

wherein when at least one emitted light is selectively shielded by the front cut-off edge, a lighting pattern with a cut-off line is formed.

* * * * *